United States Patent
Aiba et al.

(10) Patent No.: US 9,124,428 B2
(45) Date of Patent: Sep. 1, 2015

(54) COMMUNICATION METHOD, MOBILE STATION APPARATUS, BASE STATION APPARATUS AND MOBILE COMMUNICATION SYSTEM

(75) Inventors: Tatsushi Aiba, Osaka (JP); Shohei Yamada, Osaka (JP); Shoichi Suzuki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 155 days.

(21) Appl. No.: 13/636,571

(22) PCT Filed: Mar. 25, 2011

(86) PCT No.: PCT/JP2011/057428
§ 371 (c)(1),
(2), (4) Date: Nov. 14, 2012

(87) PCT Pub. No.: WO2011/118803
PCT Pub. Date: Sep. 29, 2011

(65) Prior Publication Data
US 2013/0051342 A1 Feb. 28, 2013

(30) Foreign Application Priority Data
Mar. 25, 2010 (JP) ................................. 2010-069514

(51) Int. Cl.
*H04W 4/00* (2009.01)
*H04L 1/18* (2006.01)
(Continued)

(52) U.S. Cl.
CPC ............ *H04L 1/1893* (2013.01); *H04J 11/0053* (2013.01); *H04J 13/0059* (2013.01); *H04W 28/04* (2013.01); *H04W 88/08* (2013.01)

(58) Field of Classification Search
None
See application file for complete search history.

(56) References Cited

U.S. PATENT DOCUMENTS 8,326,292 B2    12/2012    Lin
8,750,234 B2    6/2014    Aiba et al.
(Continued)

FOREIGN PATENT DOCUMENTS

EP      2 536 202 A1      12/2012
JP      2009-296589 A     12/2009
WO      WO 2009/041779 A1  4/2009

OTHER PUBLICATIONS

CMCC Huawei, "PDCCH Design of Carrier Aggregation", 3GPP TSG RAN WG1 meeting #57, R1-091829, San Francisco, USA, May 4-8, 2009.

(Continued)

*Primary Examiner* — Eunsook Choi
(74) *Attorney, Agent, or Firm* — Birch, Stewart, Kolasch & Birch, LLP

(57) ABSTRACT

To provide a mobile communication system and a communication method for enabling HARQ control information to be transmitted and received using radio resources efficiently in case that a base station apparatus and a mobile station apparatus communicate with each other in a wider frequency band using component carriers in a composite manner, in the communication method in the mobile station apparatus that transmits, to the base station apparatus, the HARQ control information for a plurality of downlink transport blocks transmitted on a plurality of downlink component carriers using a first physical uplink control channel resource, in case that the mobile station apparatus detects a single physical downlink control channel in a common search space in a certain subframe, the mobile station apparatus transmits the HARQ control information to the base station apparatus, using a second physical uplink control channel resource different from the first physical uplink control channel resource.

28 Claims, 12 Drawing Sheets

(51) Int. Cl.
  *H04W 72/00* (2009.01)
  *H04J 11/00* (2006.01)
  *H04J 13/00* (2011.01)
  *H04W 28/04* (2009.01)
  *H04W 88/08* (2009.01)

(56) References Cited

U.S. PATENT DOCUMENTS

| | | | |
|---|---|---|---|
| 8,818,364 | B2 | 8/2014 | Lin |
| 2009/0088148 | A1 | 4/2009 | Chung et al. |
| 2009/0238091 | A1* | 9/2009 | Kim et al. ............ 370/252 |
| 2009/0298493 | A1 | 12/2009 | Lin |
| 2011/0083066 | A1 | 4/2011 | Chung et al. |
| 2011/0085513 | A1* | 4/2011 | Chen et al. ............ 370/330 |
| 2011/0170496 | A1* | 7/2011 | Fong et al. ............ 370/329 |
| 2011/0261679 | A1* | 10/2011 | Li et al. ............ 370/216 |
| 2012/0039180 | A1* | 2/2012 | Kim et al. ............ 370/241 |
| 2012/0039285 | A1* | 2/2012 | Seo et al. ............ 370/329 |
| 2012/0044881 | A1* | 2/2012 | Luo et al. ............ 370/329 |
| 2012/0063324 | A1* | 3/2012 | Kim et al. ............ 370/241 |
| 2012/0113941 | A1* | 5/2012 | Chung et al. ............ 370/329 |
| 2012/0170533 | A1* | 7/2012 | Ahn et al. ............ 370/329 |
| 2013/0010721 | A1 | 1/2013 | Aiba et al. |
| 2013/0094383 | A1 | 4/2013 | Lin |
| 2013/0182675 | A1* | 7/2013 | Ahn et al. ............ 370/329 |
| 2014/0233503 | A1 | 8/2014 | Aiba et al. |

OTHER PUBLICATIONS

Ericsson, "Carrier aggregation in LTE-Advanced", TSG-RAN WG1 #53bis, R1-082468, Warsaw, Poland, Jun. 30-Jul. 4, 2008.
International Search Reporrt for PCT/JP2011/057428 dated Apr. 19, 2011.
3GPP TS 36.213 V9.0.1 (Dec. 2009), 3rd Generation Partnership Project; Technical Specification Group Radio Access Network; Evolved Universal Terrestrial Radio Access (E-UTRA); Physical Layer Procedures (Release 9), 79 pages.
Catt, Potevio, "Benefits of Carrier Indicator on Multi-Channel ACK/NACK Transmission", 3GPP TSG RAN WG1 Meeting #58, Shenzhen, China, Aug. 24-28, 2009, R1-093537, 3 pages.
Ericsson, ST-Ericsson, "On PUCCH Resource Allocation for Carrier Aggregation", 3GPP TSG-RAN WG1 #60, San Francisco, USA, Feb. 22-26, 2010, R1-100845, 3 pages.
Etri, "PUCCH ACK/NAK Resources for Carrier Aggregation", 3GPP TSG RAN WG1 Meeting #59bis, Valencia, Spain, Jan. 18-22, 2010, R1-100464, 3 pages.
Samsung, "UL HARQ-ACK Signal Transmission in Rel. 10", 3GPP TSG RAN WG1 #59bis, Valencia, Spain, Jan. 19-23, 2010, R1-100097, 4 pages.

* cited by examiner

COMMUNICATION METHOD, MOBILE STATION APPARATUS, BASE STATION APPARATUS AND MOBILE COMMUNICATION SYSTEM

TECHNICAL FIELD

The present invention relates to a mobile communication system and communication method comprised of base station apparatuses and mobile station apparatuses.

BACKGROUND ART

The 3GPP (3rd Generation Partnership Project) is a project for studying and preparing specifications of mobile communication systems based on networks evolved from W-CDMA (Wideband-Code Division Multiple Access) and GSM (Global System for Mobile Communications). The 3GPP standardized W-CDMA systems as the 3G cellular mobile communication system, and the services have been started sequentially. Further, the 3GPP has standardized HSDAP (High-Speed Downlink Packet Access) with communication rates further increased, and the services have been started. In the 3GPP, using evolution (hereinafter, referred to as "LTE (Long Term Evolution)" or "EUTRA (Evolved Universal Terrestrial Radio Access)") of the 3G radio access techniques and wider frequency bands, studies have proceeded on mobile communication systems (hereinafter, referred to as "LTE-A (Long Term Evolution-Advanced)" or "Advanced-EUTRA") for actualizing transmission and reception of data of higher rates.

As the communication schemes in LTE, considered are an OFDMA (Orthogonal Frequency Division Multiple Access) method for performing user multiplexing using mutually orthogonal subcarriers, and an SC-FDMA (Single Carrier-Frequency Division Multiple Access) method. In other words, the OFDMA method that is a multicarrier communication scheme is proposed in downlink, and the SC-FDMA method that is a single-carrier communication scheme is proposed in uplink.

Meanwhile, as the communication method in LTE-A, the OFDMA method is considered in downlink, and in uplink, in addition to the SC-FDMA method, considered is Clustered-SC-FDMA (Clustered-Single Carrier-Frequency Division Multiple Access, also referred to as DFT-s-OFDM with Spectrum Division Control and DFT-precoded OFDM). Herein, the SC-FDMA method and Clustered-SC-FDMA method, which are proposed as the uplink communication scheme in LTE and LTE-A, have characteristics that it is possible to control the PAPR (Peak to Average Power Ratio, transmit power) in transmitting data (information) to within low levels, due to performance (single-carrier performance) of single-carrier communication method.

Further, in LTE-A, in contrast to general mobile communication systems in which used frequency bands are contiguous, it is considered to use a plurality of contiguous and/or non-contiguous frequency bands (hereinafter, referred to as "component carriers (CCs)" or "carrier components (CCs)") in a composite manner to operate as a single frequency band (a wider frequency band) (also referred to as carrier aggregation, spectrum aggregation, frequency aggregation and the like). Further, in order for the base station apparatus and the mobile station apparatus to communicate using the wider frequency band more flexibly, it is also proposed to set different frequency bandwidths on a frequency band used in communications in downlink and a frequency band used in communications in uplink (Asymmetric carrier aggregation) (Non-patent Document 1).

FIG. 10 is a diagram to explain a mobile communication system subjected to carrier aggregation in conventional techniques. Setting the same bandwidth on a frequency band used in communications in downlink (DL) and a frequency band used in communications in uplink (UL) as shown in FIG. 10 is also referred to as Symmetric carrier aggregation. As shown in FIG. 10, the base station apparatus and the mobile station apparatus use a plurality of component carriers that are contiguous and/or non-contiguous frequency bands in a composite manner, and are capable of performing communications in the wider frequency band comprised of a plurality of component carriers. As an example, FIG. 10 shows that the frequency band (hereinafter, referred to as a DL system band and DL system bandwidth) with a bandwidth of 100 MHz used in communications in downlink is comprised of five downlink component carriers (DCC1 Downlink Component Carrier 1, DCC2, DCC3, DCC4, and DCC5) each with a frequency bandwidth of 20 MHz. Further, as an example, FIG. 10 shows that the frequency band (hereinafter, referred to as a UL system band and UL system bandwidth) with a bandwidth of 100 MHz used in communications in uplink is comprised of five uplink component carriers (UCC1: Uplink Component Carrier 1, UCC2, UCC3, UCC4, and UCC5) each with a frequency bandwidth of 20 MHz.

In FIG. 10, downlink channels such as Physical Downlink Control Channel (PDCCH), Physical Downlink Shared Channel (PDSCH) and the like are mapped on each downlink component carrier. The base station apparatus allocates control information (resource allocation information, MCS (Modulation and Coding Scheme) information, HARQ (Hybrid Automatic Repeat Request) processing information) and the like) to transmit a downlink transport block to be transmitted using the PDSCH to a mobile station apparatus using the PDCCH, and transmits the downlink transport block to the mobile station apparatus using the PDSCH. In other words, in FIG. 10, the base station apparatus is capable of transmitting up to five downlink transport blocks to the mobile station apparatus in the same subframe.

Meanwhile, uplink channels such as Physical Uplink Control Channel (PUCCH), Physical Uplink Shared Channel (PUSCH) and the like are mapped on each uplink component carrier. The mobile station apparatus transmits uplink control information (UCI) including control information of HARQ (Hereafter described as HARQ control information), channel state information, scheduling request and the like to the base station apparatus using the PUCCH and/or the PUSCH. Herein, the HARQ control information includes information indicative of ACK/NACK (a Positive Acknowledgement/a Negative Acknowledgement, ACK or NACK) for the PDCCH and/or a downlink transport block and/or information indicative of DTX (Discontinuous Transmission). The information indicative of DTX is information indicating that the mobile station apparatus was not able to detect the PDCCH transmitted from the base station apparatus (or may be information indicating whether the mobile station apparatus was able to detect the PDCCH).

Herein, in FIG. 10, a downlink/uplink component carrier may exist on which any downlink/uplink channel such as the PDCCH, PDSCH, PUCCH and PUSCH is not mapped.

Similarly, FIG. 11 is a diagram to explain a mobile communication system subjected to asymmetric carrier aggregation in the conventional techniques. As shown in FIG. 11, different bandwidths are set on a frequency band used in communications in downlink and a frequency band used in communications in uplink, and the base station apparatus and the mobile station apparatus use component carriers that are contiguous and/or non-contiguous frequency bands constituting the frequency bands in a composite manner, and are capable of performing communications in the wider frequency band. As an example, FIG. 11 shows that the frequency band with a bandwidth of 100 MHz used in communications in downlink is comprised of five downlink component carriers (DCC1, DCC2, DCC3, DCC4, and DCC5) each with a frequency band of 20 MHz, and that the frequency band with a bandwidth of 40 MHz used in communications in uplink is comprised of two uplink component carriers (UCC1 and UCC2) each with a frequency band of 20 MHz.

Herein, in FIG. 11, downlink channels and uplink channels are respectively mapped on downlink component carriers and uplink component carriers. And the base station apparatus assigns the PDSCH to the mobile station apparatus using the PDCCH, and transmits a downlink transport block to the mobile station apparatus using the PDSCH. In other words, in FIG. 11, the base station apparatus is capable of transmitting up to five downlink transport blocks to the mobile station apparatus in the same subframe. Meanwhile, the mobile station apparatus transmits the uplink control information including the HARQ control information, the channel state information, the scheduling request and the like to the base station apparatus using the PUCCH and/or PDSCH.

Further, in LTE-A, an assignment method is proposed in case that the base station apparatus assigns the PDSCH to the mobile station apparatus using the PDCCH on a downlink component carrier (Non-patent Document 2).

FIG. 12 is a diagram to explain an example of the method of assigning the PDSCH using the PDCCH in the conventional techniques. FIG. 12 shows a part of the downlink component carriers (portion of DCC1, DCC2 and DCC3) in FIGS. 10 and 11. As shown in FIG. 12, the base station apparatus is capable of assigning a plurality of PDSCHs to the mobile station apparatus in the same subframe, using a plurality of PDCCHs on one downlink component carrier.

As an example, FIG. 12 shows that the base station apparatus assigns PDSCHs on the DCC1, the DCC2 and the DCC3, using three PDCCHs (PDCCHs respectively shown by diagonal lines, grid lines and mesh lines) on the DCC2 (the PDSCH on the DCC1 is assigned by the PDCCH shown by diagonal lines, the PDSCH on the DCC2 is assigned by the PDCCH shown by grid lines, and the PDSCH on the DCC3 is assigned by the PDCCH shown by mesh lines.) The base station apparatus is capable of transmitting up to three downlink transport blocks to the mobile station apparatus in the same subframe, using the PDSCHs respectively on the DCC1, the DCC2 and the DCC3.

PRIOR ART DOCUMENT

Non-patent Document

Non-patent Document 1: "Carrier aggregation in LTE-Advanced", 3GPP TSG RAN WG 1 xMeeting #53bis, R1-082468, Jun. 30-Jul. 4, 2008.
Non-patent Document 2: "PDCCH Design of Carrier Aggregation", 3GPP TSG RAN WG 1 Meeting #57, R1-091829

DISCLOSURE OF INVENTION

Problems to be Solved by the Invention

However, in the conventional techniques, there is the problem that radio resources are used inefficiently in case that the base station apparatus and the mobile station apparatus transmit and receive the HARQ control information.

The present invention was made in view of such circumstances, and it is an object of the invention to provide a communication method, a mobile station apparatus, a base station apparatus and a mobile communication system for enabling the HARQ control information to be transmitted and received using radio resources efficiently in case that the base station apparatus and the mobile station apparatus communicate with each other in the wider frequency band using a plurality of component carriers in a composite manner.

Means for Solving the Problem (1) To attain the aforementioned object, the present invention took measures as described below. In other words, a communication method of an embodiment of the invention is a communication method in a mobile station apparatus that transmits, to a base station apparatus, HARQ control information for a plurality of downlink transport blocks transmitted on a plurality of downlink component carriers, using a first physical uplink control channel resource, and is characterized in that in case that the mobile station apparatus detects a single physical downlink control channel in a common search space in a subframe, the mobile station apparatus transmits HARQ control information to the base station apparatus, using a second physical uplink control channel resource different from the first physical uplink control channel resource.

(2) Further, a communication method of an embodiment of the invention is a communication method in a mobile station apparatus that transmits, to a base station apparatus, HARQ control information for a plurality of downlink transport blocks transmitted on a plurality of downlink component carriers, using a first physical uplink control channel resource, and is characterized in that in case that the mobile station apparatus detects a single physical downlink control channel corresponding to transmission of a single physical downlink shared channel only on a specific downlink component carrier in a common search space in a subframe, the mobile station apparatus transmits HARQ control information to the base station apparatus, using a second physical uplink control channel resource different from the first physical uplink control channel resource.

(3) Furthermore, a communication method of an embodiment of the invention is a communication method in a mobile station apparatus that transmits, to a base station apparatus, HARQ control information for a plurality of downlink transport blocks transmitted on a plurality of downlink component carriers, using a first transmission format, and is characterized in that in case that the mobile station apparatus detects a single physical downlink control channel in a common search space in a subframe, the mobile station apparatus transmits HARQ control information to the base station apparatus, using a second transmission format different from the first transmission format.

(4) Still furthermore, a communication method of an embodiment of the invention is a communication method in a mobile station apparatus that transmits, to a base station apparatus, HARQ control information for a plurality of downlink transport blocks transmitted on a plurality of downlink component carriers, using a first transmission format, and is characterized in that in case that the mobile station apparatus detects a single physical downlink control channel corresponding to transmission of a single physical downlink shared channel only in a specific downlink component carrier in a common search space in a subframe, the mobile station apparatus transmits HARQ control information to the base station apparatus, using a second transmission format different from the first transmission format.

(5) Moreover, in the communication method of an embodiment of the invention, it is a feature that the base station apparatus indicates the specific downlink component carrier to the mobile station apparatus using a RRC signal.

(6) Further, in the communication method of an embodiment of the invention, it is a feature that the specific downlink component carrier is a downlink component carrier associated with an uplink control carrier on which the mobile station apparatus transmits the HARQ control information using a physical uplink control channel.

(7) Furthermore, in the communication method of an embodiment of the invention, it is a feature that the HARQ control information includes information indicative of ACK/NACK for a downlink transport block.

(8) Still furthermore, in the communication method of an embodiment of the invention, it is a feature that the HARQ control information includes information indicative of DTX (Discontinuous Transmission).

(9) Moreover, in the communication method of an embodiment of the invention, it is a feature that a physical resource block used as the second physical uplink control channel resource is designated by the base station apparatus.

(10) Further, in the communication method of an embodiment of the invention, it is a feature that resource used as the second physical uplink control channel resource is identified by an orthogonal sequence and a cyclic shift designated by the base station apparatus.

(11) Furthermore, in the communication method of an embodiment of the invention, it is a feature that the number of information bits transmittable for each subframe using the second transmission format is lower than the number of information bits transmittable for each subframe using the first transmission format.

(12) Still furthermore, in the communication method of an embodiment of the invention, it is a feature that it is possible to use a modulation scheme with a lower modulation level in the second transmission format than a modulation scheme used in the first transmission format.

(13) Moreover, in the communication method of an embodiment of the invention, it is a feature that a physical resource block used in the second transmission format is designated by the base station apparatus.

(14) Further, in the communication method of an embodiment of the invention, it is a feature that resource used in the second transmission format is identified by an orthogonal sequence and a cyclic shift designated by the base station apparatus.

(15) Further, a communication method of an embodiment of the invention is a communication method in a base station apparatus that receives, from a mobile station apparatus, HARQ control information for a plurality of downlink transport blocks transmitted on a plurality of downlink component carriers, using a first physical uplink control channel resource, and is characterized in that in case that the mobile station apparatus detects a single physical downlink control channel in a common search space in a subframe, the base station apparatus receives HARQ control information from the mobile station apparatus, using a second physical uplink control channel resource different from the first physical uplink control channel resource.

(16) Furthermore, a communication method of an embodiment of the invention is a communication method in a base station apparatus that receives, from a mobile station apparatus, HARQ control information for a plurality of downlink transport blocks transmitted on a plurality of downlink component carriers, using a first physical uplink control channel resource, and is characterized in that in case that the mobile station apparatus detects a single physical uplink control channel corresponding to transmission of a single physical downlink shared channel only on a specific downlink component carrier in a common search space in a subframe, the base station apparatus receives HARQ control information from the mobile station apparatus, using a second physical uplink control channel resource different from the first physical uplink control channel resource.

(17) Still furthermore, a communication method of an embodiment of the invention is a communication method in a base station apparatus that receives, from a mobile station apparatus, HARQ control information for a plurality of downlink transport blocks transmitted on a plurality of downlink component carriers, using a first transmission format, and is characterized in that in case that the mobile station apparatus detects a single physical downlink control channel in a common search space in a subframe, the base station apparatus receives HARQ control information from the mobile station apparatus, using a second transmission format different from the first transmission format.

(18) Moreover, a communication method of an embodiment of the invention is a communication method in a base station apparatus that receives, from a mobile station apparatus, HARQ control information for a plurality of downlink transport blocks transmitted on a plurality of downlink component carriers, using a first transmission format, and is characterized in that in case that the mobile station apparatus detects a single physical uplink control channel corresponding to transmission of a single physical downlink shared channel only on a specific downlink component carrier in a common search space in a subframe, the base station apparatus receives HARQ control information from the mobile station apparatus, using a second transmission format different from the first transmission format.

(19) Further, in the communication method of an embodiment of the invention, it is a feature that the base station apparatus indicates the specific downlink component carrier to the mobile station apparatus using a RRC signal.

(20) Furthermore, in the communication method of an embodiment of the invention, it is a feature that the specific downlink component carrier is a downlink component carrier associated with an uplink control carrier on which the mobile station apparatus transmits the HARQ control information using a physical uplink control channel.

(21) Still furthermore, in the communication method of an embodiment of the invention, it is a feature that the HARQ control information includes information indicative of ACK/NACK for a downlink transport block.

(22) Moreover, in the communication method of an embodiment of the invention, it is a feature that the HARQ control information includes information indicative of DTX (Discontinuous Transmission).

(23) Further, in the communication method of an embodiment of the invention, it is a feature that a physical resource block used as the second physical uplink control channel resource is designated by the base station apparatus.

(24) Furthermore, in the communication method of an embodiment of the invention, it is a feature that resource used as the second physical uplink control channel resource is identified by an orthogonal sequence and a cyclic shift designated by the base station apparatus.

(25) Still furthermore, in the communication method of an embodiment of the invention, it is a feature that the number of information bits transmittable for each subframe using the second transmission format is lower than the number of information bits transmittable for each subframe using the first transmission format.

(26) Moreover, in the communication method of an embodiment of the invention, it is a feature that it is possible to use a modulation scheme with a lower modulation level in the second transmission format than a modulation scheme used in the first transmission format.

(27) Further, in the communication method of an embodiment of the invention, it is a feature that a physical resource block used in the second transmission format is designated by the base station apparatus.

(28) Furthermore, in the communication method of an embodiment of the invention, it is a feature that resource used in the second transmission format is identified by an orthogonal sequence and a cyclic shift designated by the base station apparatus.

(29) Further, a mobile station apparatus of an embodiment of the invention is a mobile station apparatus that transmits, to a base station apparatus, HARQ control information for a plurality of downlink transport blocks transmitted on a plurality of downlink component carriers, using a first physical uplink control channel resource, and is characterized by comprising: a unit which transmits HARQ control information to the base station apparatus, using a second physical uplink control channel resource different from the first physical uplink control channel resource, in case that the mobile station apparatus detects a single physical downlink control channel in a common search space in a subframe.

(30) Furthermore, a mobile station apparatus of an embodiment of the invention is a mobile station apparatus that transmits, to a base station apparatus, HARQ control information for a plurality of downlink transport blocks transmitted on a plurality of downlink component carriers, using a first physical uplink control channel resource, and is characterized by comprising: a unit which transmits HARQ control information to the base station apparatus, using a second physical uplink control channel resource different from the first physical uplink control channel resource, in case that the mobile station apparatus detects a single physical downlink control channel corresponding to transmission of a single physical downlink shared channel only on a specific downlink component carrier in a common search space in a subframe.

(31) Still furthermore, a mobile station apparatus of an embodiment of the invention is a mobile station apparatus that transmits, to a base station apparatus, HARQ control information for a plurality of downlink transport blocks transmitted on a plurality of downlink component carriers, using a first transmission format, and is characterized by comprising: a unit which transmits HARQ control information to the base station apparatus, using a second transmission format different from the first transmission format, in case that the mobile station apparatus detects a single physical downlink control channel in a common search space in a subframe.

(32) Moreover, a mobile station apparatus of an embodiment of the invention is a mobile station apparatus that transmits, to a base station apparatus, HARQ control information for a plurality of downlink transport blocks transmitted on a plurality of downlink component carriers, using a first transmission format, and is characterized by comprising: a unit which transmits HARQ control information to the base station apparatus, using a second transmission format different from the first transmission format, in case that the mobile station apparatus detects a single physical downlink control channel corresponding to transmission of a single physical downlink shared channel only on a specific downlink component carrier in a common search space in a sub frame.

(33) Further, a base station apparatus of an embodiment of the invention is a base station apparatus that receives, from a mobile station apparatus, HARQ control information for a plurality of downlink transport blocks transmitted on a plurality of downlink component carriers, using a first physical uplink control channel resource, and is characterized by comprising: a unit which receives HARQ control information from the mobile station apparatus, using a second physical uplink control channel resource different from the first physical uplink control channel resource, in case that the mobile station apparatus detects a single physical downlink control channel in a common search space in a subframe.

(34) Furthermore, a base station apparatus of an embodiment of the invention is a base station apparatus that receives, from a mobile station apparatus, HARQ control information for a plurality of downlink transport blocks transmitted on a plurality of downlink component carriers, using a first physical uplink control channel resource, and is characterized by comprising: a unit which receives HARQ control information from the mobile station apparatus, using a second physical uplink control channel resource different from the first physical uplink control channel resource, in case that the mobile station apparatus detects a single physical downlink control channel corresponding to transmission of a single physical downlink shared channel only on a specific downlink component carrier in a common search space in a subframe.

(35) Still furthermore, a base station apparatus of an embodiment of the invention is a base station apparatus that receives, from a mobile station apparatus, HARQ control information for a plurality of downlink transport blocks transmitted on a plurality of downlink component carriers, using a first transmission format, and is characterized by comprising: a unit which receives HARQ control information from the mobile station apparatus, using a second transmission format different from the first transmission format, in case that the mobile station apparatus detects a single physical downlink control channel in a common search space in a subframe.

(36) Moreover, a base station apparatus of an embodiment of the invention is a base station apparatus that receives, from a mobile station apparatus, HARQ control information for a plurality of downlink transport blocks transmitted on a plurality of downlink component carriers, using a first transmission format, and is characterized by comprising: a unit which receives HARQ control information from the mobile station apparatus, using a second transmission format different from the first transmission format, incase that the mobile station apparatus detects a single physical downlink control channel corresponding to transmission of a single physical downlink shared channel only on a specific downlink component carrier in a common search space in a subframe.

(37) Further, a mobile communication system of an embodiment of the invention is a mobile communication system in which a mobile station apparatus transmits, to a base station apparatus, HARQ control information for a plurality of downlink transport blocks transmitted on a plurality of downlink component carriers, using a first physical uplink control channel resource, and is characterized in that the base station apparatus transmits a single physical downlink control channel to the mobile station apparatus in a common search space in a subframe, and that in case that the mobile station apparatus detects the signal physical downlink control channel, the mobile station apparatus transmits HARQ control information to the base station apparatus, using a second physical uplink control channel resource different from the first physical uplink control channel resource.

(38) Furthermore, a mobile communication system of an embodiment of the invention is a mobile communication system in which a mobile station apparatus transmits, to a base station apparatus, HARQ control information for a plurality of downlink transport blocks transmitted on a plurality of downlink component carriers, using a first physical uplink control channel resource, and is characterized in that the base station apparatus transmits, to the mobile station apparatus, a single physical uplink control channel corresponding to transmission of a single physical downlink shared channel only on a specific downlink component carrier in a common search space in a subframe, and that in case that the mobile station apparatus detects the single physical downlink control channel, the mobile station apparatus transmits HARQ control information to the base station apparatus, using a second physical uplink control channel resource different from the first physical uplink control channel resource.

(39) Still furthermore, a mobile communication system of an embodiment of the invention is a mobile communication system in which a mobile station apparatus transmits, to a base station apparatus, HARQ control information for a plurality of downlink transport blocks transmitted on a plurality of downlink component carriers, using a first transmission format, and is characterized in that the base station apparatus transmits, to the mobile station apparatus, a single physical downlink control channel in a common search space in a subframe, and that in case that the mobile station apparatus detects the single physical downlink control channel, the mobile station apparatus transmits HARQ control information to the base station apparatus, using a second transmission format different from the first transmission format.

(40) Moreover, a mobile communication system of an embodiment of the invention is a mobile communication system in which a mobile station apparatus transmits, to a base station apparatus, HARQ control information for a plurality of downlink transport blocks transmitted on a plurality of downlink component carriers, using a first transmission format, and is characterized in that the base station apparatus transmits, to the mobile station apparatus, a single physical downlink control channel corresponding to transmission of a single physical downlink shared channel only on a specific downlink component carrier in a common search space in a subframe, and that in case that the mobile station apparatus detects the single physical downlink control channel, the mobile station apparatus transmits HARQ control information to the base station apparatus, using a second transmission format different from the first transmission format.

Advantageous Effect of the Invention

According to the invention, it is possible to transmit and receive the HARQ control information using radio resources efficiently, incase that a base station apparatus and a mobile station apparatus communicate with each other in a wider frequency band using component carriers in a composite manner.

BEST MODE FOR CARRYING OUT THE INVENTION

Figure 1:
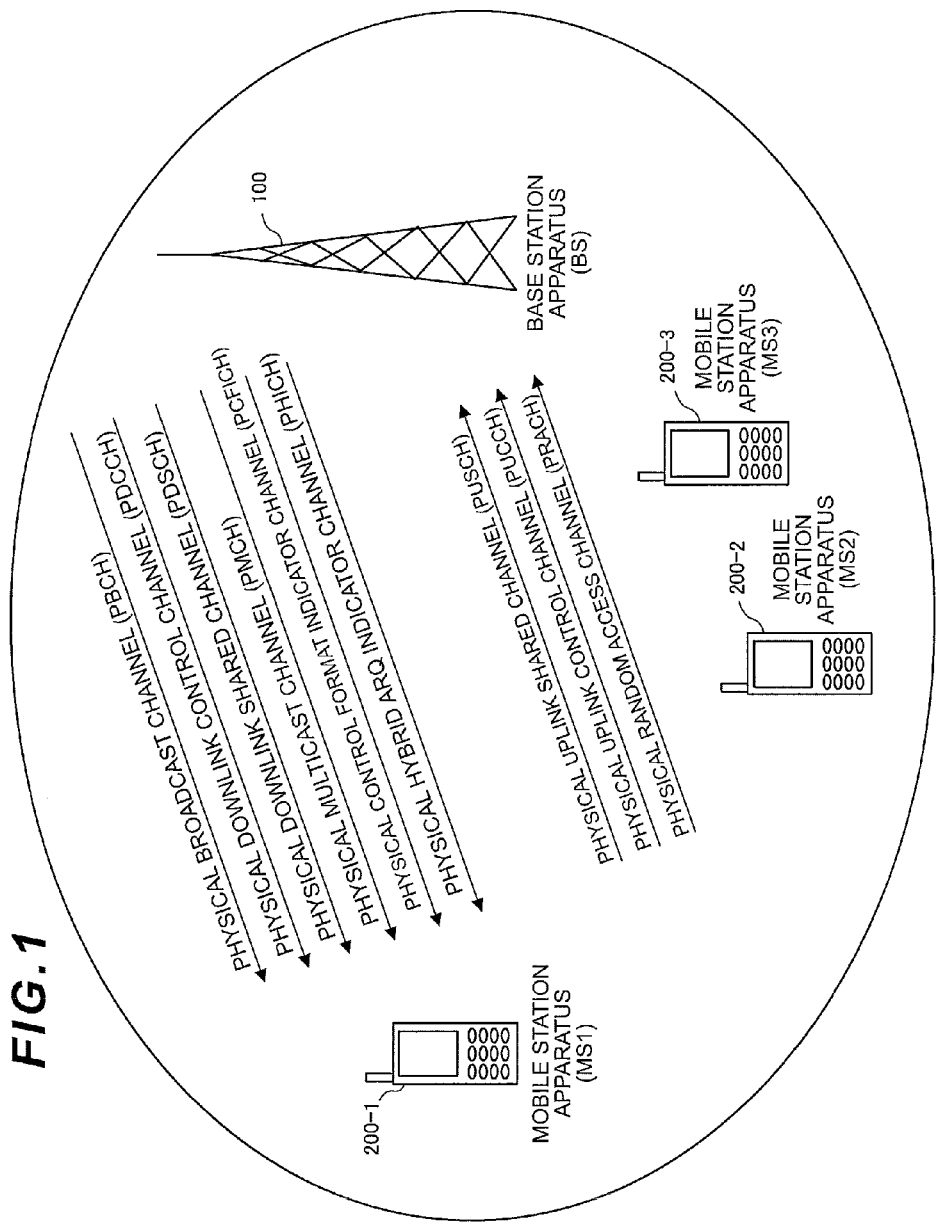
FIG. 1 is a diagram showing conceptually a configuration of physical channels according to Embodiments of the invention.

Embodiments according to the invention will be described next with reference to drawings. FIG. 1 is a diagram showing a configuration example of channels in Embodiments of the invention. Physical channels in downlink are comprised of Physical Broadcast Channel (PBCH), Physical Downlink Control Channel (PDCCH), Physical Downlink Shared Channel (PDSCH), Physical Multicast Channel (PMCH), Physical Control Format Indicator Channel (PCFICH), and Physical Hybrid ARQ Indicator Channel (PHICH).

Physical channels in uplink are comprised of Physical Uplink Shared Channel (PUSCH, Physical Uplink Control Channel (PUCCH), and Physical Random Access Channel (PRACH).

On the PBCH, the Broadcast Channel (BCH) is mapped at intervals of 40 ms. 40 ms timing is blindly detected (blind detection). In other words, explicit signaling is not performed to indicate the timing. Further, each subframe including the PBCH is capable of being decoded only by the subframe (self-decodable).

The PDCCH is a channel used to notify (designate) the mobile station apparatuses of resource allocation of PDSCH, HARQ processing information related to downlink data, resource allocation of PUSCH, etc.

The PDCCH is comprised of a plurality of control channel elements (CCEs), and the mobile station apparatus detects the PDCCH comprised of CCEs, and thereby receives the PDCCH from the base station apparatus. The CCE is comprised of a plurality of resource element groups (REGs, also referred to as mini-CCEs) mapped on the frequency domains and the time domains. Herein, the resource element is a unit resource comprised of one subcarrier (frequency component), and for example, the REG is comprised of four downlink resource elements contiguous in the frequency domain except downlink pilot channels, in the frequency domain within the same OFDM symbol. For example, one PDCCH is comprised of 1, 2, 4 or 8 CCEs such that the numbers (CCE indexes) for identifying the CCE are continuous.

Herein, the PDCCH undergoes separate coding for each mobile station apparatus and for each type. In other words, the mobile station apparatus detects a plurality of PDCCHs, and acquires resource allocation in downlink or uplink, and other control information. Each PDCCH is provided with a value of CRC (Cyclic Redundancy Check), and the mobile station apparatus performs CRC on each set of CCEs with the possibility of forming a PDCCH, and is capable of acquiring the PDCCH that the CRC succeeds. This is also referred to blind decoding, and the range of sets of CCEs with the possibility of forming a PDCCH for the mobile station apparatus to perform blind decoding is referred to as a search space. In other words, the mobile station apparatus performs blind decoding on CCEs within the search space to detect the PDCCH.

In case that resource allocation of the PDSCH is transmitted on the PDCCH, the mobile station apparatus uses the PDSCH corresponding to resource allocation indicated by the PDCCH from the base station apparatus, and receives data (hereinafter, also referred to as a downlink signal) (downlink data (Downlink Shared Channel (DL-SCH)) and/or downlink control data (downlink control information)). In other words, this PDCCH is used for transmitting a signal (hereinafter, also referred to as a "downlink transmission permission signal" and "downlink grant") to perform resource allocation on downlink.

Further, incase that resource allocation of the PUSCH is transmitted on the PDCCH, the mobile station apparatus uses the PUSCH corresponding to resource allocation indicated by the PDCCH from the base station apparatus, and transmits data (hereinafter, also referred to as an uplink signal) (uplink data (Uplink Shared Channel (UL-SCH)) and/or uplink control data (uplink control information)). In other words, this PDCCH is used for transmitting a signal (hereinafter, also referred to as an "uplink transmission permission signal" and "uplink grant") to perform resource allocation on uplink.

The PDSCH is a channel used to transmit downlink data (Downlink Shared Channel: DL-SCH) or paging information (Paging Channel: PCH). The PMCH is a channel used to transmit a Multicast Channel (MCH), and a downlink reference signal, uplink reference signal and physical downlink synchronization signal are separately allocated.

Herein, for example, the downlink data (DL-SCH) indicates transmission of user data, and the DL-SCH is a transport channel. The DL-SCH supports HARQ and dynamic adaptive radio link control, and allows beam forming to be used. The DL-SCH supports dynamic resource allocation and quasi-static resource allocation.

The PUSCH is a channel mainly used to transmit uplink data (Uplink Shared Channel: UL-SCH). Further, in case that the base station apparatus performs scheduling on the mobile station apparatus, the uplink control information is also transmitted using the PUSCH. The uplink control information includes channel state information CSI (Channel State Information or Channel Statistical Information) indicative of a channel state in downlink, channel quality indicator CQI in downlink, precoding matrix indictor PMI, rank indicator RI, and the HARQ control information.

Herein, the HARQ control information includes information indicative of ACK/NACK for the PDCCH and/or the downlink transport block transmitted from the base station apparatus and/or information indicative of DTX. The information indicative of DTX is information indicating that the mobile station apparatus was not able to detect the PDCCH transmitted from the base station apparatus (or may be information indicating whether the mobile station apparatus was able to detect the PDCCH).

Herein, for example, the uplink data (UL-SCH) indicates transmission of user data, and the UL-SCH is a transport channel. The UL-SCH supports HARQ and dynamic adaptive radio link control, and allows beam forming to be used.

The UL-SCH supports dynamic resource allocation and quasi-static resource allocation.

Further, the uplink data (UL-SCH) and downlink data (DL-SCH) may include radio resource control signals (hereinafter, referred to as a "RRC signaling: Radio Resource Control signaling") exchanged between the base station apparatus and the mobile station apparatus, a MAC (Medium Access Control) control element and the like. The base station apparatus and the mobile station apparatus transmit and receive the RRC signaling through a higher layer (a Radio Resource Control layer). Further, the base station apparatus and the mobile station apparatus transmit and receive the MAC control element through the higher layer (a MAC (Medium Access Control) layer).

The PUCCH is a channel used to transmit the uplink control information. Herein, the uplink control information includes the channel state information CSI indicative of a channel state in downlink, the channel quality indicator CQI in downlink, the precoding matrix indictor PMI, the rank indicator RI, the scheduling request (SR) for requesting resource allocation (requesting transmission on the UL-SCH) for the mobile station apparatus to transmit the uplink data, and the HARQ control information.

The PCFICH is a channel used to notify the mobile station apparatus of the number of OFDM symbols used for the PDCCH, and is transmitted in each subframe. The PHICH is the channel used to transmit ACK/NACK of HARQ in response to uplink data (UL-SCH). The PRACH is a channel used to transmit a random access preamble, and has a guard time. As shown in FIG. 1, a mobile communication system according to the Embodiments is comprised of a base station apparatus 100 and mobile station apparatuses 200.

[Configuration of the Base Station Apparatus]

Figure 2:
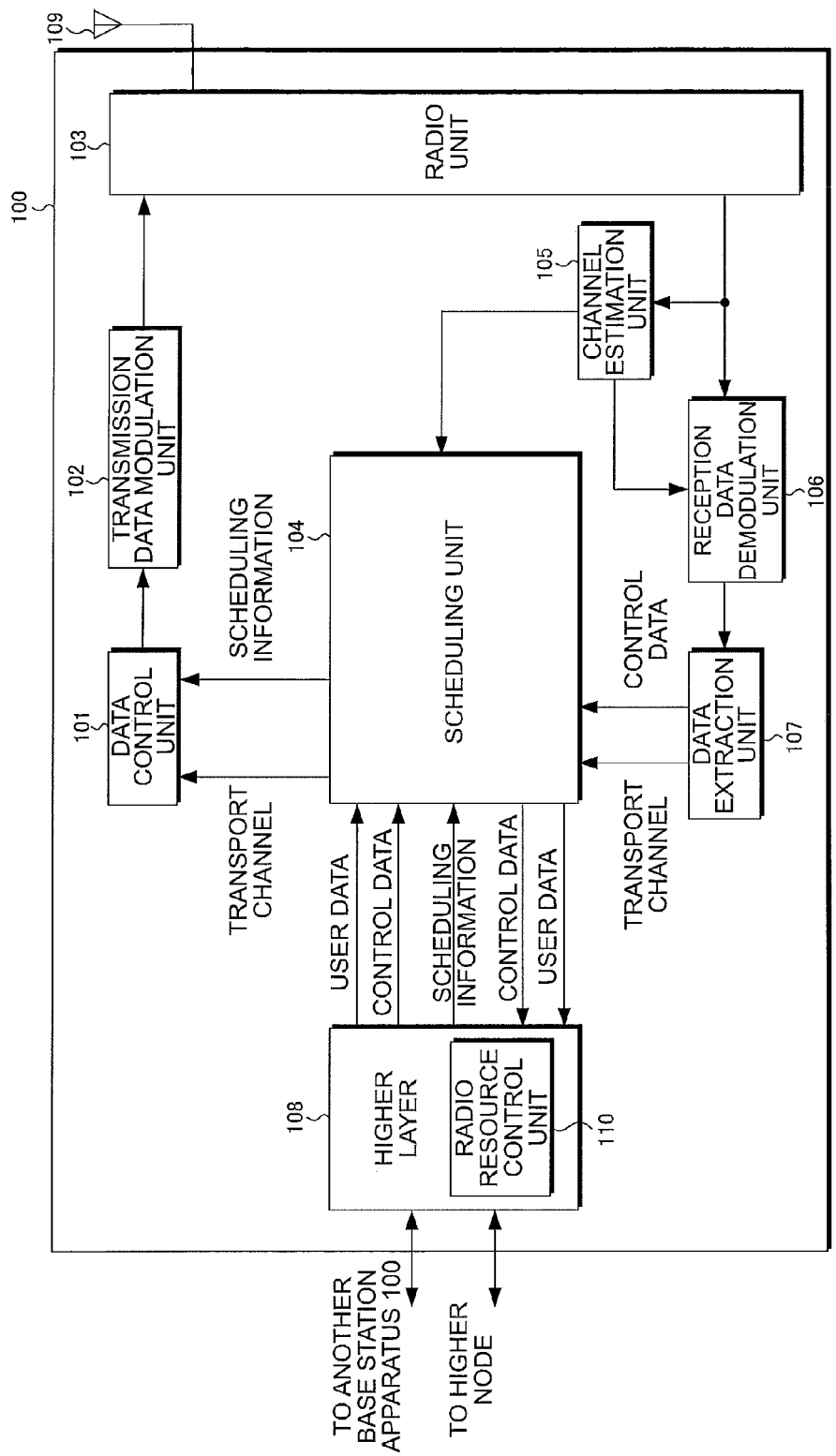
FIG. 2 is a block diagram illustrating a schematic configuration of a base station apparatus according to Embodiments of the invention.

FIG. 2 is a block diagram illustrating a schematic configuration of the base station apparatus 100 according to Embodiments of the invention. The base station apparatus 100 includes a data control unit 101, transmission data modulation unit 102, radio unit 103, scheduling unit 104, channel estimation unit 105, reception data demodulation unit 106, data extraction unit 107, higher layer 108 and antenna 109, and is comprised thereof. Further, the radio unit 103, scheduling unit 104, channel estimation unit 105, reception data demodulation unit 106, data extraction unit 107, higher layer 108 and antenna 109 constitute a base station-side reception unit, and the data control unit 101, transmission data modulation unit 102, radio unit 103, scheduling unit 104, higher layer 108 and antenna 109 constitute a base station-side transmission unit.

The antenna 109, radio unit 103, channel estimation unit 105, reception data demodulation unit 106, and data extraction unit 107 perform processing of the uplink physical layer. The antenna 109, radio unit 103, transmission data modulation unit 102 and data control unit 101 perform processing of the downlink physical layer.

The data control unit 101 receives a transport channel from the scheduling unit 104. Based on scheduling information input from the scheduling unit 104, the data control unit 101 maps the transport channel, and signals and channels generated in the physical layer to physical channels. Each data mapped as described above is output to the transmission data modulation unit 102.

The transmission data modulation unit 102 modulates the transmission data to the OFDM scheme. Based on the scheduling information from the scheduling unit 104, and the modulation scheme and coding scheme associated with each PRB, the transmission data modulation unit 102 performs signal processing of data modulation, coding, serial/parallel transform of input signal, IFFT (Inverse Fast Fourier Transform) processing, CP (Cyclic Prefix) insertion, filtering and the like on the data input from the data control unit 101, and generates transmission data to output the radio unit 103.

Herein, the scheduling information includes downlink physical resource block (PRB) assignment information, e.g. physical resource block position information comprised of frequency and time, and for example, the modulation scheme and coding scheme associated with each PRB include information of modulation scheme: 16QAM, coding rate: 2/3, etc.

The radio unit 103 up-coverts the modulation data input from the transmission data modulation unit 102 to generate a radio signal, and transmits the signal to the mobile station apparatus 200 via the antenna 109. Meanwhile, the radio unit 103 receives an uplink radio signal from the mobile station apparatus 200 via the antenna 109, down-converts the signal into a baseband signal, and outputs reception data to the channel estimation unit 105 and reception data demodulation unit 106.

The scheduling unit 104 performs processing of the Medium Access Control (MAC) layer. The scheduling unit 104 performs mapping of logical channels and transport channels, scheduling (HARQ processing, selection of transport format, etc.) in downlink and uplink, and the like. In order for the scheduling unit 104 to integrally control processing units of respective physical layers, interfaces exist between the scheduling unit 104 and the antenna 109, radio unit 103, channel estimation unit 105, reception data demodulation unit 106, data control unit 101, transmission data modulation unit 102 and data extraction unit 107 (although not shown).

In downlink scheduling, based on feedback information (uplink channel state information (CSI, CQI, PMI, RI), ACK/NACK information in response to downlink data, etc.) received from the mobile station apparatus 200, information of usable PRB of each mobile station apparatus 200, buffer status, scheduling information input from the higher layer 108, etc., the scheduling unit 104 performs processing for selecting the transport format (transmission form i.e. physical resource block allocation, modulation scheme, coding scheme, etc.) in downlink to modulate each data, retransmission control of HARQ, and generation of scheduling information used in downlink. The scheduling information used in scheduling in downlink is output to the data control unit 101.

Meanwhile, in scheduling in uplink, based on an estimation result of uplink channel state (radio channel state) output from the channel estimation unit 105, resource allocation request from the mobile station apparatus 200, information of usable PRB of each mobile station apparatus 200, scheduling information input from the higher layer 108, etc., the scheduling unit 104 performs processing for selecting the transport format (transmission form i.e. physical resource block allocation, modulation scheme, coding scheme, etc.) in uplink to modulate each data, and generation of scheduling information used in scheduling in uplink. The scheduling information used in scheduling in uplink is output to the data control unit 101.

Further, the scheduling unit 104 maps the downlink logical channel input from the higher layer 108 to the transport channel to output to the data control unit 101. Furthermore, the scheduling unit 104 processes the control data and transport channel acquired in uplink input from the data extraction unit 107, when necessary, and then, maps the resultant to the uplink logical channel to output to the higher layer 108.

For demodulation of uplink data, the channel estimation unit 105 estimates an uplink channel state from an uplink demodulation reference signal (DRS), and outputs the estimation result to the reception data demodulation unit 106. Further, in order to perform scheduling in uplink, the unit 105 estimates an uplink channel state from an uplink measurement reference signal (SRS: Sounding Reference Signal), and outputs the estimation result to the scheduling unit 104.

The reception data demodulation unit 106 also functions as an OFDM demodulation unit for demodulating reception data modulated in the OFDM scheme and/or SC-FDMA scheme and/or a DFT-Spread-OFDM (DFT-S-OFDM) demodulation unit. Based on the uplink channel state estimation result input from the channel estimation unit 105, the reception data demodulation unit 106 performs signal processing of DFT, subcarrier mapping, IFFT, filtering and the like on the modulation data input from the radio unit 103, thereby performs demodulation processing, and outputs the resultant to the data extraction unit 107.

The data extraction unit 107 checks whether or not there is an error in the data input from the reception data demodulation unit 106, and outputs the check result (Acknowledgement signal ACK/Negative Acknowledgement signal NACK) to the scheduling unit 104. Further, the data extraction unit 107 divides the data input from the reception data demodulation unit 106 into the transport channel and control data of physical layer to output to the scheduling unit 104. The divided control data includes the channel state information CSI notified from the mobile station apparatus 200, channel quality indicator CQI in downlink, precoding matrix indictor PMI, rank indicator RI, the HARQ control information, scheduling request, etc.

The higher layer 108 performs processing of Packet Data Convergence Protocol (PDCP) layer, Radio Link Control (RLC) layer, and Radio Resource Control (RRC) layer. In order for the higher layer 108 to integrally control processing units of lower layers, interfaces exist between the higher layer 108 and the scheduling unit 104, antenna 109, radio unit 103, channel estimation unit 105, reception data demodulation unit 106, data control unit 101, transmission data modulation unit 102 and data extraction unit 107 (although not shown).

The higher layer 108 has a radio resource control unit 110 (also called the control unit). Further, the radio resource control unit 110 performs management of various kinds of setting information, management of system information, paging control, management of the communication state of each mobile station apparatus 200, moving management of handover, etc., management of buffer status for each mobile station apparatus 200, management of connection setting of unicast and multicast bearer, management of mobile station identifiers (UEIDs), etc. The higher layer 108 performs delivery and acceptance of information to another base station apparatus 100 and information to a higher node.

[Configuration of the Mobile Station Apparatus 200]

Figure 3:
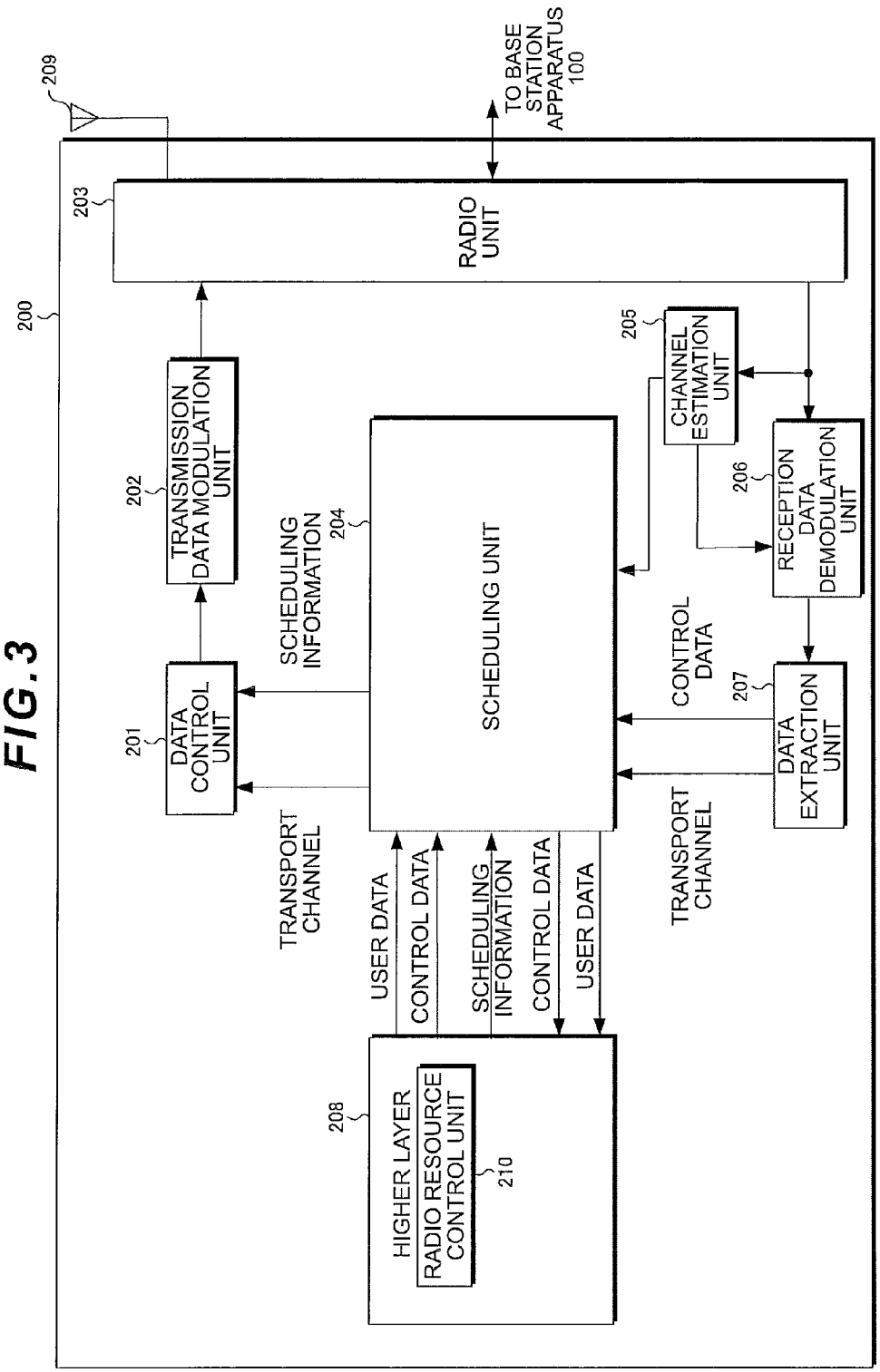
FIG. 3 is a block diagram illustrating a schematic configuration of a mobile station apparatus according to Embodiments of the invention.

FIG. 3 is a block diagram illustrating a schematic configuration of the mobile station apparatus 200 according to Embodiments of the invention. The mobile station apparatus 200 includes a data control unit 201, transmission data modulation unit 202, radio unit 203, scheduling unit 204, channel estimation unit 205, reception data demodulation unit 206, data extraction unit 207, higher layer 208 and antenna 209, and is comprised thereof. Further, the data control unit 201, transmission data modulation unit 202, radio unit 203, scheduling unit 204, higher layer 208 and antenna 209 constitute a mobile station-side transmission unit, and the radio unit 203, scheduling unit 204, channel estimation unit 205, reception data demodulation unit 206, data extraction unit 207, higher layer 208 and antenna 209 constitute a mobile station-side reception unit.

The data control unit 201, transmission data modulation unit 202, and radio unit 203 perform processing of the uplink physical layer. The radio unit 203, channel estimation unit 205, reception data demodulation unit 206, and data extraction unit 207 perform processing of the downlink physical layer.

The data control unit 201 receives a transport channel from the scheduling unit 204. Based on scheduling information input from the scheduling unit 204, the data control unit 201 maps the transport channel, and signals and channels generated in the physical layer to physical channels. Each thus mapped data is output to the transmission data modulation unit 202.

The transmission data modulation unit 202 modulates the transmission data to the OFDM scheme and/or SC-FDMA scheme. The transmission data modulation unit 202 performs signal processing of data modulation, DFT (Discrete Fourier Transform) processing, subcarrier mapping, IFFT (Inverse Fast Fourier Transform) processing, CP insertion, filtering and the like on the data input from the data control unit 201, and generates transmission data to output the radio unit 203.

The radio unit 203 up-coverts the modulation data input from the transmission data modulation unit 202 to generate a radio signal, and transmits the signal to the base station apparatus 100 via the antenna 209. Meanwhile, the radio unit 203 receives a radio signal modulated with downlink data from the base station apparatus 100 via the antenna 209, down-converts the signal into a baseband signal, and outputs reception data to the channel estimation unit 205 and reception data demodulation unit 206.

The scheduling unit 204 performs processing of the Medium Access Control (MAC) layer. The scheduling unit 204 performs mapping of logical channels and transport channels, scheduling (HARQ processing, selection of transport format, etc.) in downlink and uplink, and the like. In order for the scheduling unit 204 to integrally control processing units of respective physical layers, interfaces exist between the scheduling unit 204 and the antenna 209, data control unit 201, transmission data modulation unit 202, channel estimation unit 205, reception data demodulation unit 206, data extraction unit 207 and radio unit 203 (although not shown).

In scheduling in downlink, based on the scheduling information (transport format and HARQ retransmission information) and the like from the base station apparatus 100 and higher layer 208, the scheduling unit 204 performs reception control on transport channels, physical signals and physical channels, retransmission control of HARQ, and generation of scheduling information used in scheduling in downlink. The scheduling information used in scheduling in downlink is output to the data control unit 201.

In scheduling in uplink, based on uplink buffer status input from the higher layer 208, uplink scheduling information (transport format, HARQ retransmission information, etc.) from the base station apparatus 100 input from the data extraction unit 207, scheduling information input from the higher layer 208, etc., the scheduling unit 204 performs scheduling processing to map the uplink logical channel input from the higher layer 208 to the transport channel, and generation of scheduling information used in scheduling in uplink. In addition, as the uplink transport format, the unit 204 uses information notified from the base station apparatus 100. The scheduling information is output to the data control unit 201.

Further, the scheduling unit 204 maps the uplink logical channel input from the higher layer 208 to the transport channel to output to the data control unit 201. Furthermore, the scheduling unit 204 also outputs, to the data control unit 201, the downlink channel state information CSI input from the channel estimation unit 205, channel quality indicator CQI in downlink, precoding matrix indictor PMI, rank indicator RI, and the check result of CRC input from the data extraction unit 207. Still furthermore, the scheduling unit 204 processes the control data and transport channel acquired in downlink input from the data extraction unit 207, when necessary, and then, maps the resultant to the downlink logical channel to output to the higher layer 208.

For demodulation of downlink data, the channel estimation unit 205 estimates a downlink channel state from a downlink reference signal (RS), and outputs the estimation result to the reception data demodulation unit 206. Further, in order to notify the base station apparatus 100 of the estimation result of the downlink channel state (radio channel state), the channel estimation unit 205 estimates a downlink channel state from a downlink reference signal (RS), and outputs the estimation result to the scheduling unit 204, as the downlink channel state information CSI, channel quality indicator CQI in downlink, precoding matrix indictor PMI, and rank indicator RI.

The reception data demodulation unit 206 demodulates the reception data modulated in the OFDM scheme. Based on the downlink channel state estimation result input from the channel estimation unit 205, the reception data demodulation unit 206 performs demodulation processing on the modulation data input from the radio unit 203 to output to the data extraction unit 207.

The data extraction unit 207 performs CRC on the data input from the reception data demodulation unit 206 to check whether or not there is an error, and outputs the check result (Acknowledgement ACK/Negative Acknowledgement NACK) to the scheduling unit 204. Further, the data extraction unit 207 divides the data input from the reception data demodulation unit 206 into the transport channel and control data of physical layer to output to the scheduling unit 204. The divided control data includes scheduling information of resource allocation in downlink or uplink, HARQ control information in uplink, etc.

The higher layer 208 performs processing of Packet Data Convergence Protocol (PDCP) layer, Radio Link Control (RLC) layer, and Radio Resource Control (RRC) layer. In order for the higher layer 208 to integrally control processing units of lower layers, interfaces exist between the higher layer 208 and the scheduling unit 204, antenna 209, data control unit 201, transmission data modulation unit 202, channel estimation unit 205, reception data demodulation unit 206, data extraction unit 207 and radio unit 203 (although not shown).

The higher layer 208 has a radio resource control unit 210 (also called the control unit). The radio resource control unit 210 performs management of various kinds of setting information, management of system information, paging control, management of the communication state of the mobile station 200, moving management of handover, etc., management of buffer status, management of connection setting of unicast and multicast bearer, management of the mobile station identifier (UEID), etc.

[In Regard to the Downlink Radio Frame]

Figure 4:
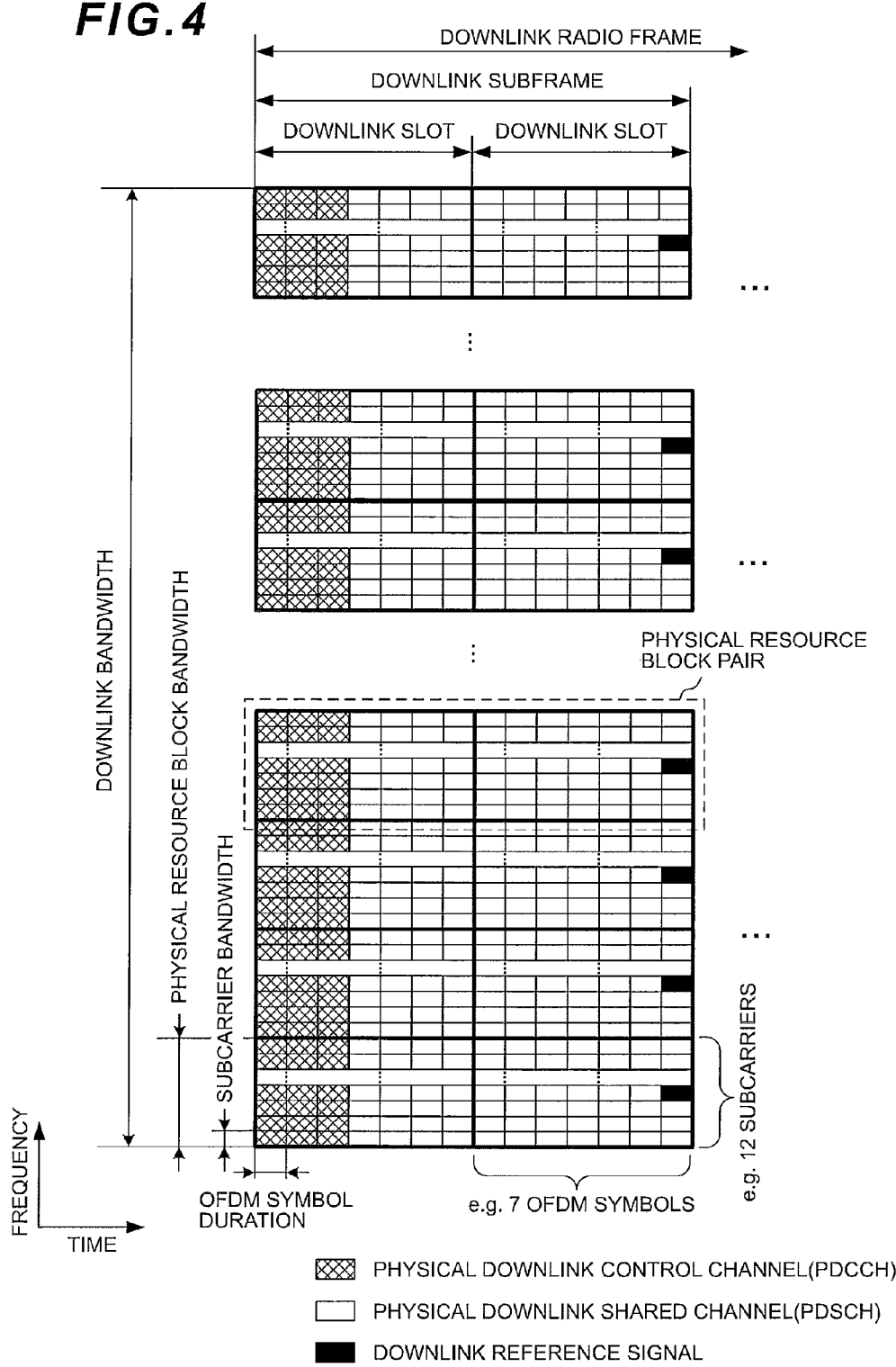
FIG. 4 is a diagram showing an example of a downlink radio frame configuration according to Embodiments of the invention.

FIG. 4 is a schematic diagram showing an example of a configuration of the downlink radio frame in the Embodiments. In FIG. 4, the horizontal axis represents the time domain, and the vertical axis represents the frequency domain. As shown in FIG. 4, the downlink radio frame is comprised of a plurality of physical resource block (PRB) pairs (shown by regions surrounded by dashed lines). This physical resource block pair is a unit of RB used in allocating downlink radio resources, and is comprised of a frequency domain (e.g. PRB bandwidth: 180 kHz) and a time domain (e.g. two slots=one subframe (time frame): 1 ms) which are predetermined.

Further, one physical resource block pair is comprised of two downlink physical resource blocks (PRB bandwidth× slot) contiguous in the time domain. One physical resource block (shown by regions surrounded by bold lines) is comprised of 12 subcarriers (15 kHz) in the frequency domain, while being comprised of 7 OFDM (Orthogonal Frequency Division Multiplexing) symbols in the time domain.

Herein, in the time domain, there are a slot (0.5 ms) comprised of 7 OFDM symbols, subframe (1 ms) comprised of 2 slots, and radio frame (10 ms) comprised of 10 subframes. Further, in the frequency domain, a plurality of physical resource blocks is set corresponding to the downlink bandwidth. In addition, a unit comprised of one subcarrier and one OFDM symbol is also referred to as a downlink resource element.

The PDCCH (shown by mesh lines), the PDSCH (shown by white rectangles) and the downlink reference signal (shown by black rectangles) are mapped in each downlink subframe.

The PDCCH is allocated from the first OFDM symbol of the subframe. For example, the number of OFDM symbols which is used for mapping the PDCCH are "1" to "3", and it is possible to map PDCCH of the number of OFDM symbols varying for each subframe. Downlink control information (DCI) including the downlink scheduling information, uplink scheduling information, etc is transmitted on the PDCCH.

For example, information indicative of a modulation scheme for the PDSCH, information indicative of a coding scheme, information indicative of PDSCH resource allocation, information related to HARQ, TPC (Transmission Power Control) command, etc. is transmitted on the PDCCH for the downlink. Meanwhile, for example, information indicative of a modulation scheme for the PUSCH, information indicative of a coding scheme, information indicative of PUSCH resource allocation, information related to HARQ, TPC command, etc. is transmitted on the PDCCH for the uplink.

In each subframe, the PDSCHs are mapped to the OFDM symbols except for the OFDM symbols on which the PDCCH is mapped. The PDSCH is used for transmitting downlink data (or may be transport blocks for the DL-SCH). Further, the downlink reference signals are mapped to a part of PDSCH allocated. The downlink reference signals are allocated while being spread in the frequency domain and time domain.

[In Regard to PDCCH]

The PDCCH will be described more specifically. The PDCCH is composed of a single or a plurality of control channel elements (CCEs). The control channel element is comprised of a plurality of resource elements spread in the frequency domain and the time domain within a space to which the PDCCH is allocated.

Further, a plurality of control channel elements constitutes a common search space and a user equipment specific-search space.

The common search space is a space, which is common to a plurality of mobile station apparatuses 200. And PDCCH for a plurality of mobile station apparatuses and/or PDCCH for a particular mobile station apparatus 200 are allocated in the common search space. Herein, the common search space is comprised of predetermined control channel elements. The user equipment specific-search space is a space, in which PDCCH for a particular mobile station apparatus 200 is allocated. And the user equipment specific-search space is set for each mobile station apparatus 200. For the common search space and the user equipment-specific search space, different spaces are set for each number of control channel elements in which the PDCCH is allocated.

Herein, the common search space and a part or the whole of user equipment-specific search spaces may overlap one another. Further, a part or the whole of different common search spaces may overlap one another. Furthermore, a part or the whole of different user equipment-specific search spaces for the same mobile station apparatus 200 may overlap one another. Still furthermore, a part or the whole of user equipment-specific search spaces for different mobile station apparatuses 200 may overlap one another.

Further, the common search space and/or the user equipment-specific search space (which may be the starting points of the common search space and/or the starting points of user equipment-specific search space) may be calculated by the mobile station apparatus 200, based on a parameter (e.g. index of the subframe in which the PDCCH is transmitted, C-RNTI, DCC specific index provided for each DLCC, etc.) set from the base station apparatus 100.

Furthermore, a downlink component carrier in which the common search space and/or the user equipment-specific search space is allocated may be set on the mobile station apparatus 200 by the base station apparatus 100. For example, the base station apparatus 100 is capable of setting the downlink component carrier, in which the common search space and/or the user equipment-specific search space are allocated, on the mobile station apparatus 200 for each mobile station apparatus 200 and/or for each downlink component carrier.

Moreover, a plurality of formats is defined for downlink control information (DCI) transmitted on the PDCCH. The downlink control information format is also referred to as a DCI format. For example, as DCI formats for the uplink, DCI format 0 used in the case where the mobile station apparatus 200 transmits on the PUSCH with one transmission antenna port, DCI format 0A used in the case where the mobile station apparatus 200 transmits on the PUSCH in MIMO (Multiple Input Multiple Output) SM (Spatial Multiplexing), and the like are defined.

Meanwhile, as DCI formats for the downlink, DCI format 1 and DCI format 1A used in the case where the base station apparatus 100 transmits on the PDSCH using one transmission antenna port, or transmission diversity scheme with a plurality of transmission antenna ports, DCI format 2 used in the case where the base station apparatus 100 transmits on the PDSCH in MIMO SM, and the like are defined. For the DCI formats, formats with the same number of bits and formats with the different numbers of bits are defined.

The downlink control information is transmitted, by the base station apparatus, with Cyclic Redundancy Check (CRC) scrambled by RNTI (Radio Network Temporary Identity). Here, the CRC is generated based on the downlink control information (DCI). The mobile station apparatus 200 changes interpretation of the downlink control information, corresponding to which RNTI is scrambled to the Cyclic Redundancy Check. For example, in case that the Cyclic Redundancy Check is scrambled by the C-RNTI (Cell-Radio Network Temporary Identity) which is assigned from the base station apparatus 100, the mobile station apparatus 200 determines that the downlink control information is downlink control information for the mobile apparatus 200 itself.

Further, the base station apparatus 100 encodes the downlink control information in accordance with the number of bits of the control channel element. And the base station apparatus 100 allocate the downlink control information in the common search space or the user equipment-specific search space. Herein, the base station apparatus 100 performs same coding on the DCI formats with the same number of bits, while performing different coding on the DCI formats with the different numbers of bits. In other words, the coding schemes that the base station apparatus 100 applies to the DCI formats are different corresponding to the number of bits of the DCI format, and therefore, methods of DCI format decoding are different in the mobile station apparatus 200.

In other words, the mobile station apparatus 200 is capable of determining the type of DCI format from the number of bits of the DCI format and/or the difference of the decoding method. Herein, in case that the numbers of bits of DCI formats are the same, the DCI formats include information to determine the type of DCI format. Alternatively, by using the method of adding the Cyclic Redundancy Check scrambled by the RNTI associated with the type of DCI format and the like, the mobile station apparatus 200 is allowed to determine the type of DCI format.

The mobile station apparatus 200 performs decoding processing on all candidates for spaces in which the PDCCH is allocated, in the common search space and the user equipment-specific search space. Further, the mobile station apparatus 200 descrambles the sequence which is the Cyclic Redundancy Check scrambling by the RNTI, by using the RNTI. And in case that the mobile station apparatus 200 detects there is not any error by the descrambled Cyclic Redundancy Check, determines that acquisition (detection) of the PDCCH succeeds. This processing is referred to as blind decoding.

The base station apparatus 100 allocates the PDCCH with the C-RNTI in the common search space and/or the user equipment-specific search space. For example, the base station apparatus 100 allocates the PDCCH in the user equipment-specific search space for the mobile station apparatus 200 to which the C-RNTI is assigned. The mobile station apparatus 200 blindly decodes the PDCCH with the C-RNTI in the common search space and/or the user equipment-specific search space.

Further, the base station apparatus 100 is capable of allocating, in the common search space, the PDCCH with P-RNTI (Paging-Radio Network Temporary Identity) used in scheduling of paging information, the PDCCH with SI-RNTI (System Information-Radio Network Temporary Identity) used in scheduling of system information, and the PDCCH with RA-RNTI (Random Access-Radio Network Temporary Identity) used in scheduling of random access response. The mobile station apparatus 200 blindly decodes the PDCCH with the P-RNTI, the PDCCH with the SI-RNTI, and the PDCCH with the RA-RNTI in the common search space.

Embodiment 1

Described next is Embodiment 1 in the mobile communication system using the base station apparatus 100 and mobile station apparatus 200. In Embodiment 1, the base station apparatus 100 transmits a first parameter for designating a first region in which the mobile station apparatus 200 is capable of using the PUCCH to the mobile station apparatus 200, and further transmits a second parameter for designating a second region different from the first region in which the mobile station apparatus 200 is capable of using the PUCCH to the mobile station apparatus 200, and corresponding to a search space in which the mobile station apparatus 200 detects the PDCCH, the mobile station apparatus 200 transmits the HARQ control information to the base station apparatus 100 using the first region or the second region.

Further, the base station apparatus 100 transmits a first parameter for designating a first region in which the mobile station apparatus 200 is capable of using the PUCCH to the mobile station apparatus 200, and further transmits a second parameter for designating a second region different from the first region in which the mobile station apparatus 200 is capable of using the PUCCH to the mobile station apparatus 200, and the mobile station apparatus 200 transmits the HARQ control information to the base station apparatus 100 using the first region in case of detecting a plurality of PDCCHs in the user equipment-specific search space and/or the common search space, while transmitting the HARQ control information to the base station apparatus 100 using the first region or the second region in case of detecting one PDCCH in the user equipment-specific search space and/or the common search space.

Furthermore, the base station apparatus 100 transmits a first parameter for designating a first region in which the mobile station apparatus 200 is capable of using the PUCCH to the mobile station apparatus 200, and further transmits a second parameter for designating a second region different from the first region in which the mobile station apparatus 200 is capable of using the PUCCH to the mobile station apparatus 200, and the mobile station apparatus 200 transmits the HARQ control information to the base station apparatus 100 using the first region in case of detecting one PDCCH in the user equipment-specific search space, while transmitting the HARQ control information to the base station apparatus 100 using the second region in case of detecting one PDCCH in the common search space.

Still furthermore, the base station apparatus 100 transmits a first parameter for designating a first region in which the mobile station apparatus 200 is capable of using the PUCCH to the mobile station apparatus 200, and further transmits a second parameter for designating a second region different from the first region in which the mobile station apparatus 200 is capable of using the PUCCH to the mobile station apparatus 200, and the mobile station apparatus 200 transmits the HARQ control information to the base station apparatus 100 using the first region in case of detecting a plurality of PDCCHs in the user equipment-specific search space and/or the common search space or detecting one PDCCH in the user equipment-specific search space, while transmitting the HARQ control information to the base station apparatus 100 using the second region in case of detecting one PDCCH in the common search space.

Moreover, the base station apparatus 100 transmits a first parameter for designating a first region in which the mobile station apparatus 200 is capable of using a first transmission format to the mobile station apparatus 200, and further transmits a second parameter for designating a second region different from the first region in which the mobile station apparatus 200 is capable of using a second transmission format to the mobile station apparatus 200, and corresponding to a search space in which the mobile station apparatus 200 detects the PDCCH, the mobile station apparatus 200 transmits the HARQ control information to the base station apparatus 100 using the first transmission format or the second transmission format.

Further, the base station apparatus 100 transmits a first parameter for designating a first region in which the mobile station apparatus 200 is capable of using a first transmission format to the mobile station apparatus 200, and further transmits a second parameter for designating a second region different from the first region in which the mobile station apparatus 200 is capable of using a second transmission format to the mobile station apparatus 200, and the mobile station apparatus 200 transmits the HARQ control information to the base station apparatus 100 using the first transmission format in case of detecting a plurality of PDCCHs in the user equipment-specific search space and/or the common search space, while transmitting the HARQ control information to the base station apparatus 100 using the first transmission format or the second transmission format in case of detecting one PDCCH in the user equipment-specific search space and/or the common search space.

Furthermore, the base station apparatus 100 transmits a first parameter for designating a first region in which the mobile station apparatus 200 is capable of using a first transmission format to the mobile station apparatus 200, and further transmits a second parameter for designating a second region different from the first region in which the mobile station apparatus 200 is capable of using a second transmission format to the mobile station apparatus 200, and the mobile station apparatus 200 transmits the HARQ control information to the base station apparatus 100 using the first transmission format in case of detecting one PDCCH in the user equipment-specific search space, while transmitting the HARQ control information to the base station apparatus 100 using the second transmission format in case of detecting one PDCCH in the common search space.

Still furthermore, the base station apparatus 100 transmits a first parameter for designating a first region in which the mobile station apparatus 200 is capable of using a first transmission format to the mobile station apparatus 200, and further transmits a second parameter for designating a second region different from the first region in which the mobile station apparatus 200 is capable of using a second transmission format to the mobile station apparatus 200, and the mobile station apparatus 200 transmits the HARQ control information to the base station apparatus 100 using the first transmission format in case of detecting a plurality of PDCCHs in the user equipment-specific search space and/or the common search space or detecting one PDCCH in the user equipment-specific search space, while transmitting the HARQ control information to the base station apparatus 100 using the second transmission format in case of detecting one PDCCH in the common search space.

Herein, the mobile station apparatus 200 detecting a PDCCH means that the mobile station apparatus 200 detects the PDCCH for the mobile station apparatus 200 itself. Further, the HARQ control information transmitted from the mobile station apparatus 200 includes information indicative of ACK/NACK for the PDCCH and/or the downlink transport block transmitted from the base station apparatus 100 and/or information indicative of DTX. The information indicative of DTX is information indicating that the mobile station apparatus 200 was not able to detect the PDCCH transmitted from the base station apparatus 100 (or may be information indicating whether the mobile station apparatus 200 was able to detect the PDCCH).

Further, the first parameter transmitted from the base station apparatus 100 to the mobile station apparatus 200 includes information indicative of a bandwidth (bandwidth of the PUCCH resource region) for designating the first region in which the mobile station apparatus 200 is capable of using the PUCCH. Furthermore, the first parameter includes information (which may be information with regard to the orthogonal resource or information which is used to calculate the orthogonal resource) for indicating the orthogonal resource for designating the first region in which the mobile station apparatus 200 is capable of using the PUCCH.

Furthermore, the first parameter includes information indicative of a bandwidth (bandwidth of the PUCCH resource region) in which the mobile station apparatus 200 is capable of using the first transmission format. Still furthermore, the first parameter includes information (which may be information with regard to the orthogonal resource or information which is used to calculate the orthogonal resource) for indicating the orthogonal resource in which the mobile station apparatus 200 is capable of using the first transmission format.

Moreover, the second parameter transmitted from the base station apparatus 100 to the mobile station apparatus 200 includes information indicative of a bandwidth (bandwidth of the PUCCH resource region) for designating the second region in which the mobile station apparatus 200 is capable of using the PUCCH. Further, the second parameter includes information (which may be information with regard to the orthogonal resource or information which is used to calculate the orthogonal resource) for indicating the orthogonal resource for designating the second region in which the mobile station apparatus 200 is capable of using the PUCCH.

Further, the second parameter includes information indicative of a bandwidth (bandwidth of the PUCCH resource region) in which the mobile station apparatus 200 is capable of using the second transmission format. Furthermore, the second parameter includes information (which may be information with regard to the orthogonal resource or information which is used to calculate the orthogonal resource) for indicating the orthogonal resource in which the mobile station apparatus 200 is capable of using the second transmission format.

In the following description, in this Embodiment, the frequency band is defined using a bandwidth (Hz), but may be defined using the number of resource blocks (RBs) comprised of frequency and time. In other words, the bandwidth may be defined using the number of resource blocks. Further, the bandwidth and the number of resource blocks can be defined using the number of subcarriers.

The component carrier in this Embodiment indicates a (narrow-band) frequency band that is used in a composite manner in case that the base station apparatus 100 and the mobile station apparatus 200 communicate with each other in a mobile communication system having the wider frequency band (which may be a system band). The (wider) frequency band (e.g. a frequency band with a bandwidth of 100 MHz) is configured by aggregating a plurality of component carriers (e.g. five component carriers each with a bandwidth of 20 MHz), and the base station apparatus 100 and the mobile station apparatus 200 use the plurality of component carriers in a composite manner, and are thereby capable of achieving high-speed data communications (transmission and reception of information).

The component carrier indicates each of (narrow-band) frequency bands (e.g. frequency band with a bandwidth of 20 MHz) constituting the wider frequency band (e.g. frequency band with a bandwidth of 100 MHz). Further, the component carrier may indicate the (center) carrier frequency of each of (narrow-band) frequency bands. In other words, a downlink component carrier has a band (bandwidth) of a part of usable frequency bands in case that the base station apparatus 100 and the mobile station apparatus 200 transmit and receive downlink information, and an uplink component carrier has a band (bandwidth) of a part of usable frequency bands in case that the base station apparatus 100 and the mobile station apparatus 200 transmit and receive uplink information. Further, the component carrier may be defined as a unit in which a particular physical channel (e.g. the PDCCH, the PUCCH, etc.) is configured.

Further, component carriers may be mapped on contiguous frequency bands, or may be mapped on non-contiguous frequency bands. A plurality of component carriers that are contiguous and/or non-contiguous frequency bands is aggregated to form the wider frequency band, and the base station apparatus 100 and the mobile station apparatus 200 use the plurality of component carriers in a composite manner, and are thereby capable of achieving high-speed data communications (transmission and reception of information).

Furthermore, it is not necessary that the frequency band used in communications of downlink comprised of component carriers and the frequency band used in communications of uplink comprised of component carriers have the same bandwidth, and the base station apparatus 100 and the mobile station apparatus 200 are capable of performing communications, using the downlink frequency band and the uplink frequency band with different bandwidths comprised of component carriers in a composite manner (asymmetric carrier aggregation as described above).

Figure 5:
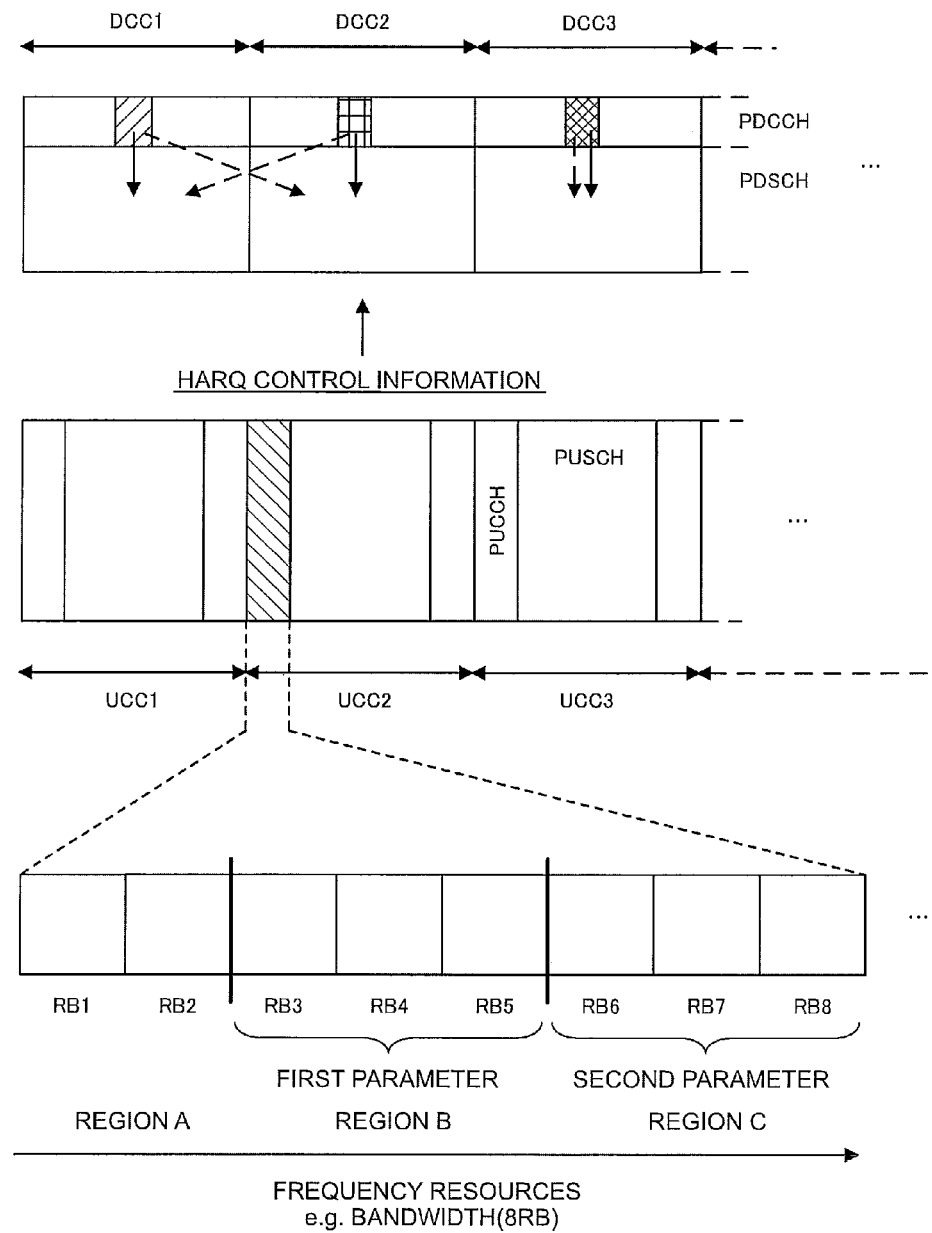
FIG. 5 is a diagram showing an example of a mobile communication system to which Embodiment 1 is applicable.

FIG. 5 is a diagram showing an example of a mobile communication system to which Embodiment 1 is applicable. Embodiment 1 is applicable to both a mobile communication system of the symmetric carrier aggregation and a mobile communication system of the asymmetric carrier aggregation. Further, in the following description, as an example, only an enlarged part of component carriers are described, but as a matter of course, it is possible to apply the Embodiment to all component carriers.

As an example to explain Embodiment 1, FIG. 5 shows three downlink component carriers (DCC1, DCC2 and DCC3). Further, FIG. 5 shows three uplink component carriers (UCC1, UCC2 and UCC3).

In FIG. 5, the base station apparatus 100 assigns (schedules) (one or a plurality of) PDSCHs in the same subframe, using (one or a plurality of) PDCCHs on the downlink component carriers.

The base station apparatus 100 is capable of assigning the PDSCH on the same component carrier as the component carrier on which the PDCCH is mapped. In FIG. 5, as an example, it is shown by solid lines that the base station apparatus 100 uses the PDCCH (PDCCH shown by diagonal lines) on the DCC1, and assigns the PDSCH on the DCC1. Further, it is shown by solid lines that the base station apparatus 100 uses the PDCCH (PDCCH shown by grid lines) on the DCC2, and assigns the PDSCH on the DCC2. Furthermore, it is shown by solid lines that the base station apparatus 100 uses the PDCCH (PDCCH shown by mesh lines) on the DCC3, and assigns the PDSCH on the DCC3.

Further, the base station apparatus 100 is capable of assigning the PDSCH on a component carrier which is the same or different as/from the component carrier on which the PDCCH is mapped. For example, the base station apparatus 100 transmits a carrier indicator field (CIF, e.g. information field represented by three bits) on the PDCCH to the mobile station apparatus 200, and is thereby capable of assigning the PDSCH allocated to a component carrier which is the same or different as/from the component carrier on which the PDCCH is mapped.

In other words, the base station apparatus 100 is capable of transmitting, on the PDCCH, the carrier indicator field for indicating the component carrier on which the PDCCH assigning the PDSCH is mapped. The base station apparatus 100 transmits the carrier indicator field on the PDCCH to the mobile station apparatus 200, and thereby assigns the PDSCH on the same or different as/from the component carrier on which the PDCCH is mapped.

Herein, it is beforehand defined which value of the carrier indicator field transmitted on the PDCCH from the base station apparatus 100 indicates what component carrier on which the PDCCH assigning the PDSCH is mapped, and such definition is made known information between the base station apparatus 100 and the mobile station apparatus 200.

For example, the base station apparatus 100 transmits the carrier indicator field indicating some specific value (for example, the information field represented by three bits indicates "000") on the PDCCH to the mobile station apparatus 200, and thereby assigns, to the mobile station apparatus 200, the PDSCH on the same component carrier as the component carrier on which the PDCCH is mapped. Further, the base station apparatus 100 transmits the carrier indicator field indicating a value except the specific value (for example, the information field represented by three bits indicates a value except "000") on the PDCCH to the mobile station apparatus 200, and thereby assigns, to the mobile station apparatus 200, the PDSCH on the different component carrier from the component carrier on which the PDCCH is mapped.

In FIG. 5, as an example, it is shown by dotted lines that the base station apparatus 100 uses the PDCCH (PDCCH shown by diagonal lines) on the DCC1, and assigns the PDSCH on the DCC2. Further, it is shown by dotted lines that the base station apparatus 100 uses the PDCCH (PDCCH shown by grid lines) on the DCC2, and assigns the PDSCH on the DCC1. Furthermore, it is shown by dotted lines that the base station apparatus 100 uses the PDCCH (PDCCH shown by mesh lines) on the DCC3, and assigns the PDSCH on the DCC3.

Further, the base station apparatus 100 is capable of setting information indicating whether or not to transmit the carrier indicator field on the PDCCH for each mobile station apparatus 200. For example, the base station apparatus 100 transmits the information indicating whether or not to transmit the carrier indicator field on the PDCCH using the RRC signaling to set on the mobile station apparatus 200. In other words, since the setting of whether or not to transmit the carrier indicator field on the PDCCH is performed for each mobile station apparatus 200, the carrier indicator field is not transmitted on the PDCCH in the common search space that is a common space to a plurality of mobile station apparatuses 200. Furthermore, the base station apparatus 100 is capable of setting the information indicating whether or not to transmit the carrier indicator field on the PDCCH for each component carrier. For example, the base station apparatus 100 transmits the information indicating whether or not to transmit the carrier indicator field on the PDCCH using the RRC signaling for each component carrier to set on the mobile station apparatus 200.

In FIG. 5, the base station apparatus 100 transmits the downlink transport block to the mobile station apparatus 200, using the PDSCH assigned by the PDCCH. For example, the base station apparatus 100 uses the PDSCHs assigned respectively by PDCCHs on the DCC1, the DCC2 and the DCC3, and transmits the downlink transport blocks (for example, up to three blocks) in the same subframe to the mobile station apparatus 200.

Herein, the base station apparatus 100 is capable of setting a correspondence (linking) between the downlink component carrier and the uplink component carrier specifically for the cell. For example, the base station apparatus 100 is capable of setting the correspondence between the downlink component carrier and the uplink component carrier on the mobile station apparatus 200 by using broadcast information (broadcast channel).

Further, the base station apparatus 100 is capable of setting the correspondence between the downlink component carrier and the uplink component carrier specifically for the mobile station apparatus. For example, the base station apparatus 100 is capable of setting the correspondence between the downlink component carrier and the uplink component carrier on the mobile station apparatus 200 by using the RRC signaling.

In FIG. 5, the mobile station apparatus 200 uses the PUSCH assigned by the PDCCH (which also means an uplink transmission permission signal) transmitted from the base station apparatus 100, and transmits the uplink transport block (which also means the transport block related to the UL-SCH) to the base station apparatus 100. For example, the mobile station apparatus 200 uses the PUSCHs respectively on the UCC1, the UCC2 and the UCC3, and transmits the uplink transport blocks (for example, up to three blocks) in the same subframe to the base station apparatus 100.

Further, the mobile station apparatus 200 transmits, to the base station apparatus 100, the HARQ control information for the PDCCH and/or the downlink transport block transmitted from the base station apparatus 100, using the PUCCH.

Herein, the base station apparatus 100 is capable of setting an uplink component carrier for the mobile station apparatus 200 to transmit the HARQ control information on the mobile station apparatus 200. For example, the base station apparatus 100 is capable of setting one uplink component carrier for the mobile station apparatus 200 to transmit the HARQ control information on the mobile station apparatus 200, using the RRC signaling. As an example, FIG. 5 shows that the base station apparatus 100 sets the UCC2 as the uplink component carrier for the mobile station apparatus 200 to transmit the HARQ control information. The mobile station apparatus 200 uses the PUCCH on the UCC2 set by the base station apparatus 100 to transmit the HARQ control information.

In FIG. 5, the region extending by dotted lines from the PUCCH (PUCCH resource region shown by diagonal lines) on the UCC2 conceptually shows the PUCCH on the UCC2. Herein, to make the description easy to understand, the horizontal direction represents frequency resources (or may represent the bandwidth), and orthogonal resources, described later, are not described.

In FIG. 5, the base station apparatus 100 transmits the first parameter for designating the first region (region B shown by from RB3 to RB5) for enabling the mobile station apparatus 200 to use the PUCCH. In other words, the base station apparatus 100 designates the first region for the mobile station apparatus 200 to transmit the HARQ control information from among the PUCCH resource region on the UCC2. For example, the base station apparatus 100 transmits the first parameter using the RRC signaling, and thereby designates the first region specifically for the mobile station apparatus. Further, for example, the base station apparatus 100 transmits the first parameter using the broadcast channel, and thereby designates the first region specifically for the cell.

For example, the base station apparatus 100 transmits information indicative of the bandwidth of PUCCH resource as the first parameter, and thereby designates the first region for the mobile station apparatus 200. Further, for example, the base station apparatus 100 transmits information for indicating the orthogonal resource, described later, as the first parameter, and thereby designates the first region for the mobile station apparatus 200. Herein, the base station apparatus 100 may notify (set) a starting position of the first region as the first parameter to designate the first region. Meanwhile, the mobile station apparatus 200 is also capable of identifying a region A (region A shown by RB1 and RB2) by receiving the first parameter from the base station apparatus 100.

Further, in FIG. 5, the base station apparatus 100 transmits the second parameter for designating the second region (region C shown by from RB6 to RB8) for enabling the mobile station apparatus 200 to use the PUCCH. In other words, the base station apparatus 100 is capable of designating the second region for the mobile station apparatus 200 to transmit the HARQ control information from among the PUCCH resource region. For example, the base station apparatus 100 transmits the second parameter using the RRC signaling, and thereby designate the second region specifically for the mobile station apparatus. Further, for example, the base station apparatus 100 transmits the second parameter using the broadcast channel, and thereby designates the second region specifically for the cell.

For example, the base station apparatus 100 transmits information indicative of the bandwidth of PUCCH resource as the second parameter, and thereby designates the second region for the mobile station apparatus 200. Further, for example, the base station apparatus 100 transmits information for indicating the orthogonal resource, described later, as the second parameter, and thereby designates the second region for the mobile station apparatus 200. Herein, the base station apparatus 100 may notify (set) a starting position of the second region as the second parameter to designate the second region.

For example, in FIG. 5, the base station apparatus 100 is capable of transmitting the first parameter for designating the first region for enabling the mobile station apparatus 200 to use the PUCCH to the mobile station apparatus 200 using the RRC signaling, while transmitting the second parameter for designating the second region for enabling use of PUCCH to the mobile station apparatus 200 using the broadcast channel. The base station apparatus 100 thus designates the first parameter and the second parameter, and is thereby capable of setting, on the mobile station apparatus 200, the first region for enabling use of PUCCH for each mobile station apparatus 200, and the second region for enabling use of PUCCH for each cell.

Thus, the base station apparatus sets the first region and/or second region specifically for the mobile station apparatus and/or for each cell, and for example, is thereby capable of setting (reserving) the first region to be larger in case that the number of mobile station apparatuses 200 communicating using a plurality of component carriers is high, while setting (reserving) the second region to be larger in case that the number of mobile station apparatuses 200 communicating using one component carrier is high.

Further, in FIG. 5, the base station apparatus 100 is capable of assigning the PUCCH for the mobile station apparatus 200 to transmit the HARQ control information using the RRC signaling. In other words, the base station apparatus 100 is capable of indicating, to the mobile station apparatus 200, PUCCH resource in the region which is used to transmit the HARQ control information in each of the first region and the second region designated for the mobile station apparatus 200, using the RRC signaling.

Furthermore, the base station apparatus 100 is capable of assigning the PUCCH for the mobile station apparatus 200 to transmit the HARQ control information, while associating with the PDCCH. In other words, the base station apparatus 100 is capable of indicating, to the mobile station apparatus 200, PUCCH resource in the region which is used to transmit the HARQ control information in each of the first region and the second region designated for the mobile station apparatus 200, while associating with the PDCCH.

For example, the base station apparatus 100 is capable of indicating, to the mobile station apparatus 200, PUCCH resource in the region which is used to transmit the HARQ control information in each of the first region and the second region, by associating with a position of the PDCCH on the downlink component carrier in the PDCCH resource region. In other words, the mobile station apparatus 200 maps the HARQ control information to the PUCCH resource in each of the first region and the second region, corresponding to the position of the PDCCH transmitted from the base station apparatus 100 in the PDCCH resource region.

Herein, the correspondence between the PDCCH transmitted from the base station apparatus 100 and the PUCCH resource in each of the first region and the second region is, for example, specified by associating an index of the first CCE of CCEs constituting the PDCCH with an index of the PUCCH resource in each of the first region and the second region.

In FIG. 5, using the PUCCH resource assigned by the base station apparatus 100, the mobile station apparatus 200 transmits the HARQ control information to the base station apparatus 100.

Herein, the mobile station apparatus 200 transmits the HARQ control information to the base station apparatus 100, using the PUCCH resource in the first region or the PUCCH resource in the second space, corresponding to a search space in which the mobile apparatus 200 detects the PDCCH in a certain subframe. In other words, the base station apparatus 100 allocates the PDCCH in the search space (the search space defined in the PDCCH resource region). And the mobile station apparatus 200 transmits the HARQ control information to the base station apparatus 100 using the PUCCH resource in the first region or the PUCCH resource in the second region, corresponding to the search space in which the PDCCH is detected. Further, using the region A (region A shown by RB1 and RB2), for example, the mobile station apparatus 200 can transmits the CSI and the CQI to the base station apparatus 100.

Further, in FIG. 5, in case that the mobile station apparatus 200 detects a plurality of PDCCHs in the user equipment-specific search space and/or the common search space in a certain subframe, the mobile station apparatus 200 transmits the HARQ control information using the first region. In other words, the base station apparatus 100 allocates a plurality of PDCCHs in the user equipment-specific search space and/or the common search space, and in case that the mobile station apparatus 200 detects the plurality of PDCCHs in the user equipment-specific search space and/or the common search space, the mobile station apparatus 200 transmits the HARQ control information using the first region.

For example, in FIG. 5, in case that the mobile station apparatus 200 detects a plurality of PDCCHs in the user equipment-specific search space and/or the common search space of each of the DCC1, the DCC2 and the DCC3, the mobile station apparatus 200 transmits the HARQ control information using the first region. Further, for example, in case that the mobile station apparatus 200 detects a plurality of PDCCHs in the user equipment-specific search space and/or the common search space of the DCC2, the mobile station apparatus 200 transmits the HARQ control information using the first region.

Further, in FIG. 5, in case that the mobile station apparatus 200 detects one PDCCH in the user equipment-specific search space and/or the common search space in a certain subframe, the mobile station apparatus 200 transmits the HARQ control information using the first region or the second region. In other words, the base station apparatus 100 allocates one PDCCH in the user equipment-specific search space and/or the common search space, and in case that the mobile station apparatus 200 detects the one PDCCH in the user equipment-specific search space and/or the common search space, the mobile station apparatus 200 transmits the HARQ control information, using the first region or the second region.

Herein, in case that the mobile station apparatus 200 detects one PDCCH in the user equipment-specific search space, the mobile station apparatus 200 transmits the HARQ control information using the first region. In other words, the base station apparatus 100 allocates one PDCCH in the user equipment-specific search space, and in case that the mobile station apparatus 200 detects the one PDCCH in the user equipment-specific search space, the mobile station apparatus 200 transmits the HARQ control information using the first region.

Meanwhile, in case that the mobile station apparatus 200 detects one PDCCH in the common search space, the mobile station apparatus 200 transmits the HARQ control information using the second region. In other words, the base station apparatus 100 allocates one PDCCH in the common search space, and in case that the mobile station apparatus 200 detects the one PDCCH in the common search space, the mobile station apparatus 200 transmits the HARQ control information using the second region.

For example, in FIG. 5, in case that the mobile station apparatus 200 detects one PDCCH in the user equipment-specific search space of the DCC2, the mobile station apparatus 200 transmits the HARQ control information using the first region. Meanwhile, in case that the mobile station apparatus 200 detects one PDCCH in the common search space of the DCC2, the mobile station apparatus 200 transmits the HARQ control information using the second region.

In other words, the mobile station apparatus 200 transmits the HARQ control information for a plurality of PDCCHs detected in the user equipment-specific search space and/or the common search space and/or the downlink transport blocks transmitted on a plurality of PDSCHs (assigned by a plurality of PDCCHs) to the base station apparatus 100, using the first region.

Further, the mobile station apparatus 200 transmits the HARQ control information for one PDCCH detected in the user equipment-specific search space and/or the downlink transport block transmitted on one PDSCH (assigned by one PDCCH) to the base station apparatus 100, using the first region.

In other words, in case that the mobile station apparatus 200 detects a plurality of PDCCHs in the user equipment-specific search space and/or the common search space in some subframe, or in case that the mobile station apparatus 200 detects one PDCCH in the user equipment-specific search space, the mobile station apparatus 200 transmits the HARQ control information using the first region.

Meanwhile, the mobile station apparatus 200 transmits the HARQ control information for one PDCCH detected in the common search space and/or the downlink transport block transmitted on one PDSCH (assigned by one PDCCH) to the base station apparatus 100, using the second region.

Herein, in case that one PDCCH which is used to assign one PDSCH on a specific downlink component carrier is detected in the common search space in a certain subframe, the mobile station apparatus 200 may transmit the HARQ control information to the base station apparatus 100, using the second region.

In other words, in case that the base station apparatus 100, in a certain subframe, assigns (schedules) one PDCCH in the common search space, and assigns (schedules) one PDSCH on the specific downlink component carrier, the mobile station apparatus 200 may transmit the HARQ control information using the second region.

Namely, in case that the mobile station apparatus 200 detects, in the common search space, one PDCCH which is used to assign (schedule) one PDSCH on the specific downlink component carrier, the mobile station apparatus 200 may transmit the HARQ control information using the second region.

Herein, the base station apparatus 100 is capable of setting the specific downlink component carrier on the mobile station apparatus 200. In other words, in case that the base station apparatus 100 assigns (schedules) the PDSCH on the specific downlink component carrier set on the mobile station apparatus 200, using the PDCCH in the common search space, and the mobile station apparatus 200 detects, in the common search space, the PDCCH which is used to assign the PDSCH on the specific downlink component carrier set by the base station apparatus 100, the mobile station apparatus 200 may transmit the HARQ control information using the second region.

For example, the base station apparatus 100 is capable of setting the specific downlink component carrier on the mobile station apparatus 200 specifically for the cell, using the broadcast information (the broadcast channel). Further, for example, the base station apparatus 100 is capable of setting the specific downlink component carrier on the mobile station apparatus 200 specifically for the mobile station apparatus, using the RRC signaling.

In other words, in case that the mobile station apparatus 200 detects one PDCCH, which is used to assign one PDSCH on except for the specific downlink component carrier set by the base station apparatus 100, in the common search space, the mobile station apparatus 200 may transmit the HARQ control information using the first region. Meanwhile, in case that the mobile station apparatus 200 detects one PDCCH, which is used to assign one PDSCH on the specific downlink component carrier set by the base station apparatus 100, in the common search space, the mobile station apparatus 200 transmits the HARQ control information using the second region.

For example, in FIG. 5, in case that the DCC2 is set as the specific downlink component carrier by using the broadcast information (the broadcast channel) from the base station apparatus 100, and in case that the PDCCH detected in the common search space of the DCC1 and/or the DCC2 and/or the DCC3 is used to assign (schedule) the PDSCH on except for the DCC2, the mobile station apparatus 200 may transmit the HARQ control information using the first region.

Further, for example, in case that the DCC2 is set as the specific downlink component carrier by using the RRC signaling from the base station apparatus 100, and in case that the PDCCH detected in the common search space of the DCC1 and/or the DCC2 and/or the DCC3 is used to assign (schedule) the PDSCH on except for the DCC2, the mobile station apparatus 200 may transmit the HARQ control information using the first region.

Meanwhile, in FIG. 5, in case that the DCC2 is set as the specific downlink component carrier by using the broadcast information (the broadcast channel) from the base station apparatus 100, and in case that the PDCCH detected in the common search space of the DCC1 and/or the DCC2 and/or the DCC3 is used to assign (schedule) the PDSCH on the DCC2 (the PDSCH transmission only on the DCC2), the mobile station apparatus 200 may transmit the HARQ control information using the second region.

Further, for example, in case that the DCC2 is set as the specific downlink component carrier by using the RRC signaling from the base station apparatus 100, and in case that the PDCCH detected in the common search space of the DCC1 and/or the DCC2 and/or the DCC3 is used to assign (schedule) the PDSCH on the DCC2 (the PDSCH transmission only on the DCC2), the mobile station apparatus 200 may transmit the HARQ control information using the second region.

Furthermore, in FIG. 5, the base station apparatus 100 and the mobile station apparatus 200 are capable of setting, as the specific downlink component carrier, a downlink component carrier associated with an uplink component carrier set, by the base station apparatus 100, as the uplink component carrier on which the HARQ control information is transmitted using the PUCCH.

In other words, in case that the mobile station apparatus 200 detects one PDCCH, which is used to assign one PDSCH on except for the downlink component carrier associated with the uplink component carrier set by the base station apparatus 100 as the uplink component carrier on which the HARQ control information is transmitted, in the common search space, the mobile station apparatus 200 may transmit the HARQ control information using the first region.

Meanwhile, in case that the mobile station apparatus 200 detects one PDCCH, which is used to assign one PDSCH on the downlink component carrier associated with the uplink component carrier set by the base station apparatus 100 as the uplink component carrier on which the HARQ control information is transmitted, in the common search space, the mobile station apparatus 200 transmits the HARQ control information using the second region.

For example, in FIG. 5, in case that the association with the DCC2 and the UCC2 is set by using the broadcast information (the broadcast channel) from the base station apparatus 100, and in case that the PDCCH detected in the common search space of the DCC1 and/or the DCC2 and/or the DCC3 is used to assign (schedule) the PDSCH on except for the DCC2, the mobile station apparatus 200 may transmit the HARQ control information the first region.

Further, for example, in FIG. 5, in case that the association with the DCC2 and the UCC2 is set by using the RCC signaling from the base station apparatus 100, and in case that the PDCCH detected in the common search space of the DCC1 and/or the DCC2 and/or the DCC3 is used to assign (schedule) the PDSCH on except for the DCC2, the mobile station apparatus 200 may transmit the HARQ control information using the first region.

Meanwhile, for example, in FIG. 5, in case that the association with the DCC2 and the UCC2 is set by using the broadcast information (the broadcast channel) from the base station apparatus 100, and in case that the PDCCH detected in the common search space of the DCC1 and/or the DCC2 and/or the DCC3 is used to assign (schedule) the PDSCH on the DCC2 (the PDSCH transmission only on the DCC2), the mobile station apparatus 200 may transmit the HARQ control information using the second region.

Further, for example, in FIG. 5, in case that the association with the DCC2 and the UCC2 is set by using the RCC signaling from the base station apparatus 100, and in case that the PDCCH detected in the common search space of the DCC1 and/or the DCC2 and/or the DCC3 is used to assign (schedule) the PDSCH on the DCC2 (the PDSCH transmission only on the DCC2), the mobile station apparatus 200 may transmit the HARQ control information using the second region.

Herein, as described above, in FIG. 5, the base station apparatus 100 sets the UCC2 as the uplink component carrier for the mobile station apparatus 200 to transmit the HARQ control information.

Further, in FIG. 5, in case that the mobile station apparatus 200 transmits the HARQ control information using the PUCCH resource in the first region, the mobile station apparatus 200 transmits the HARQ control information to the base station apparatus 100 using the first transmission format. In other words, the base station apparatus 100 transmits, to the mobile station apparatus 200, the first parameter for designating the first region for enabling the mobile station apparatus 200 to use the first transmission format. And the mobile station apparatus 200 transmits the HARQ control information to the base station apparatus 100 using the first transmission format on the PUCCH resource in the first region.

Further, in case that the mobile station apparatus 200 transmits the HARQ control information using the PUCCH resource in the second region, the mobile station apparatus 200 transmits the HARQ control information to the base station apparatus 100 using the second transmission format. In other words, the base station apparatus 100 transmits, to the mobile station apparatus 200, the second parameter for designating the second region, which is different from the first space, for enabling the mobile station apparatus 200 to use the second transmission format. And the mobile station apparatus 200 transmits the HARQ control information to the base station apparatus 100 using the second transmission format on the PUCCH resource in the second region.

In other words, in case that the mobile station apparatus 200 detects a plurality of PDCCHs in the user equipment-specific search space and/or the common search space in a certain subframe, the mobile station apparatus 200 transmits the HARQ control information using the first transmission format. Meanwhile, in case that the mobile station apparatus 200 detects one PDCCH in the user equipment-specific search space and/or the common search space in a certain subframe, the mobile station apparatus 200 transmits the HARQ control information using the first transmission format or the second transmission format.

Further, in case that the mobile station apparatus 200 detects one PDCCH in the user equipment-specific search space in a certain subframe, the mobile station apparatus 200 transmits the HARQ control information using the first transmission format. In other words, incase that the mobile station apparatus 200 detects a plurality of PDCCHs in the user equipment-specific search space and/or the common search space in a certain subframe, or in case that the mobile station apparatus 200 detects one PDCCH in the user equipment-specific search space, the mobile station apparatus 200 transmits the HARQ control information using the first transmission format.

Meanwhile, in case that the mobile station apparatus 200 detects one PDCCH in the common search space in a certain subframe, the mobile station apparatus 200 transmits the HARQ control information using the second transmission format. Herein, in case that one PDCCH detected in the common search space in a certain subframe is used to assign (schedule) one PDSCH on the specific downlink component carrier, the mobile station apparatus 200 may transmit the HARQ control information using the second transmission format.

Herein, by using the first transmission format, the mobile station apparatus 200 is capable of transmitting the uplink control information (that may be the HARQ control information) with a larger amount than the uplink control information capable of being transmitted using the second transmission format.

For example, using the first transmission format, the mobile station apparatus 200 transmits the HARQ control information for a plurality of PDCCHs on respectively to the DCC1, the DCC2 and the DCC3 and/or a plurality of downlink transport blocks. Meanwhile, for example, using the second transmission format, the mobile station apparatus 200 transmits the HARQ control information for one PDCCH in the common search space of the DCC2 and/or one downlink transport block.

In other words, the number of information bits transmittable per subframe using the first transmission format can be made higher than the number of information bits transmittable per subframe using the second transmission format.

Further, the mobile station apparatus 200 is capable of applying a modulation scheme with a higher modulation level than a modulation scheme applied to the uplink control information (that may be the control information in HARQ) transmitted using the second transmission format, to the uplink control information transmitted using the first transmission format.

For example, using the first transmission format, the mobile station apparatus 200 applies 8PSk (8 Phase Shift Keying) or QAM (Quadrature Amplitude Modulation) to the uplink control information. Herein, for example, using the second transmission format, the mobile station apparatus 200 applies BPSk (Binary Phase Shift Keying) or QPSK (Quadrature Phase Shift Keying) to the uplink control information.

In other words, it is possible to apply a modulation scheme with a higher modulation level than a modulation scheme applied to the uplink control information transmitted using the second transmission format, to the uplink control information transmitted using the first transmission format. In other words, it is possible to make the information amount per symbol transmittable using the first transmission format larger than the information amount per symbol transmittable using the second transmission format.

Further, the mobile station apparatus 200 is capable of configuring (generating) orthogonal resource of the PUCCH transmitted using the first transmission format (the PUCCH on which the uplink control information (that may be the HARQ control information) transmitted using the first transmission format is mapped) and the orthogonal resource of the PUCCH transmitted using the second transmission format (the PUCCH on which the uplink control information transmitted using the second transmission format is mapped) by different methods.

Herein, the base station apparatus 100 may designate the configuration methods (generation methods) of the orthogonal resource of the PUCCH transmitted using the first transmission format and the orthogonal resource of the PUCCH transmitted using the second transmission format for the mobile station apparatus 200. In other words, it is possible to configure the orthogonal resource of the PUCCH transmitted using the first transmission format and the orthogonal resource of the PUCCH transmitted using the second transmission format by different methods.

Figure 6:
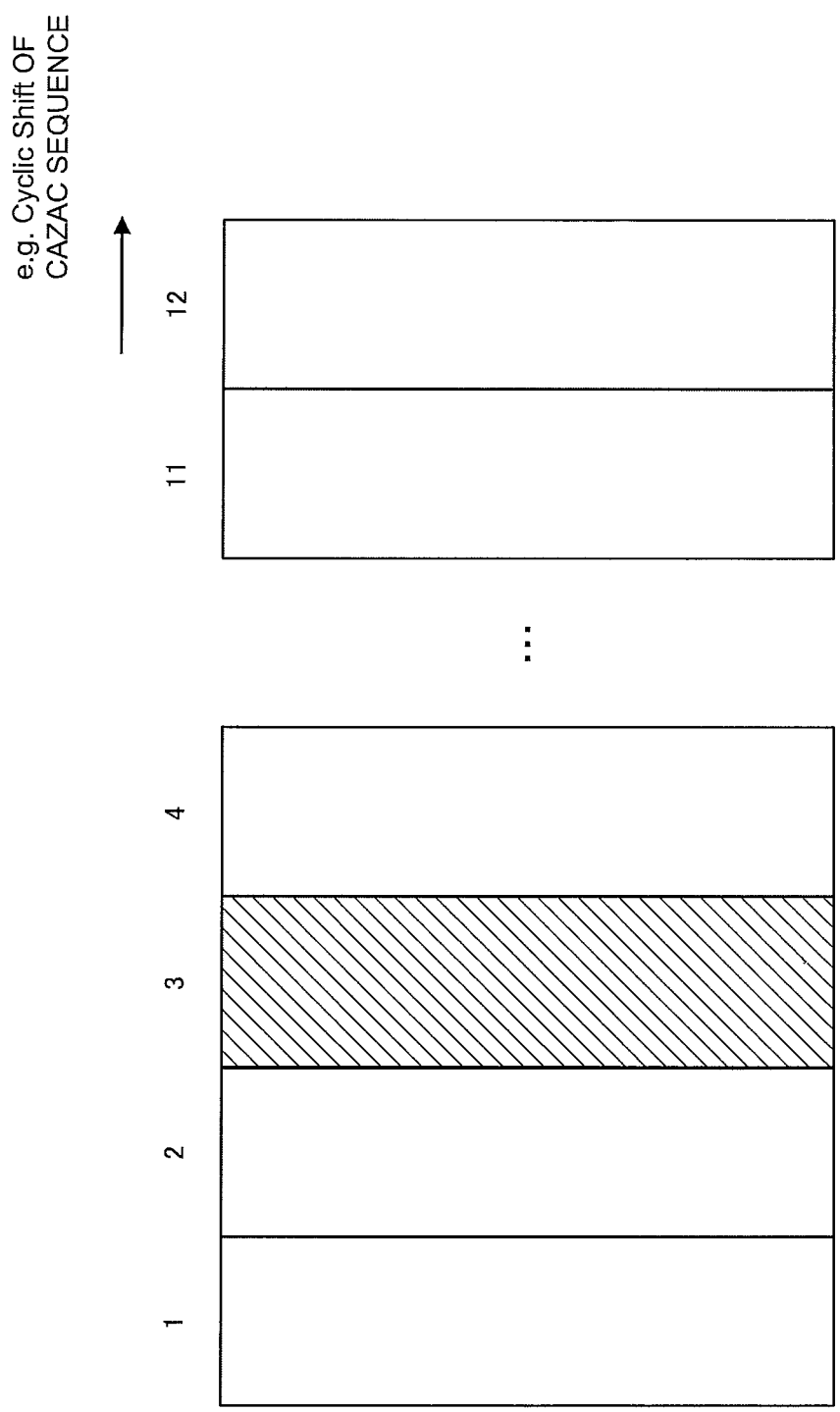
FIG. 6 is a diagram showing a configuration example of orthogonal resources of a physical uplink control channel.

FIG. 6 conceptually shows a configuration example of orthogonal resource of a PUCCH used by the mobile station apparatus 200 in transmitting uplink control information. In FIG. 6, as a configuration example of the orthogonal resource, the horizontal direction represents a cyclic shift of CAZAC sequence (cyclic shifts of CAZAC sequence represented by the numbers of "1" to "12").

For example, the mobile station apparatus 200 transmits the uplink control information, using the orthogonal resource (the orthogonal resource with the number of cyclic shifts of CAZAC sequence being "3" shown by the black rectangle) of the PUCCH. In other words, the mobile station apparatus 200 applies the cyclic shift of CAZAC sequence in the frequency domain to the PUCCH to orthogonalize resource, and is capable of transmitting the uplink control information using orthogonalized resource.

Figure 7:
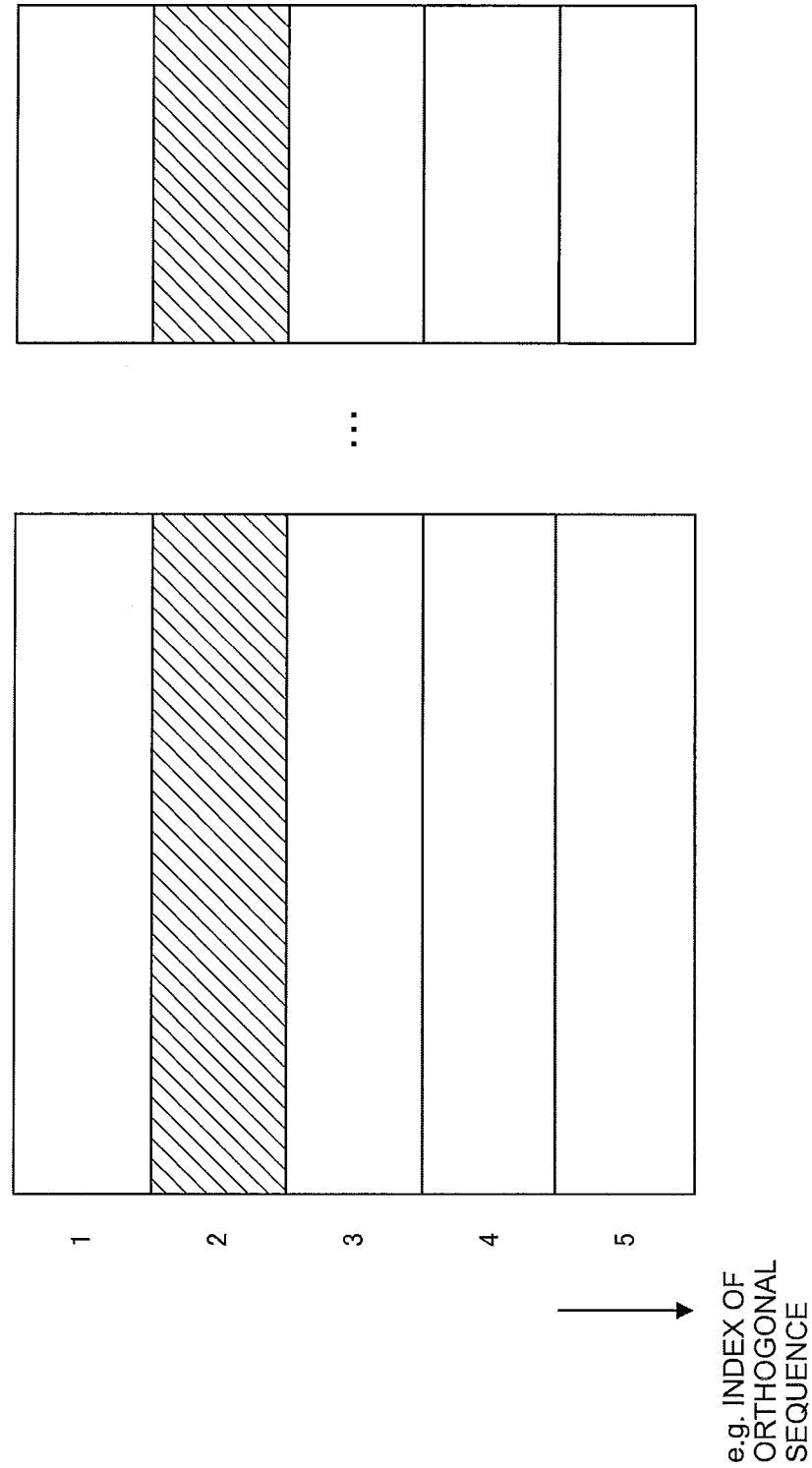
FIG. 7 is a diagram showing another configuration example of orthogonal resources of the physical uplink control channel.

Similarly, FIG. 7 conceptually shows a configuration example of orthogonal resource of a PUCCH used by the mobile station apparatus 200 in transmitting uplink control information. In FIG. 7, as a configuration example of the orthogonal resource, the vertical direction represents the index (indexes of orthogonal sequences represented by the numbers of "1" to "5") of orthogonal sequence (orthogonal code).

For example, the mobile station apparatus 200 transmits the uplink control information, using the orthogonal resource (the orthogonal resource with the index of orthogonal sequence being "2" shown by diagonal lines) of the PUCCH. In other words, the mobile station apparatus 200 applies the orthogonal sequence in the time domain to the PUCCH to orthogonalize resource, and is capable of transmitting the uplink control information using orthogonalized resource.

Figure 8:
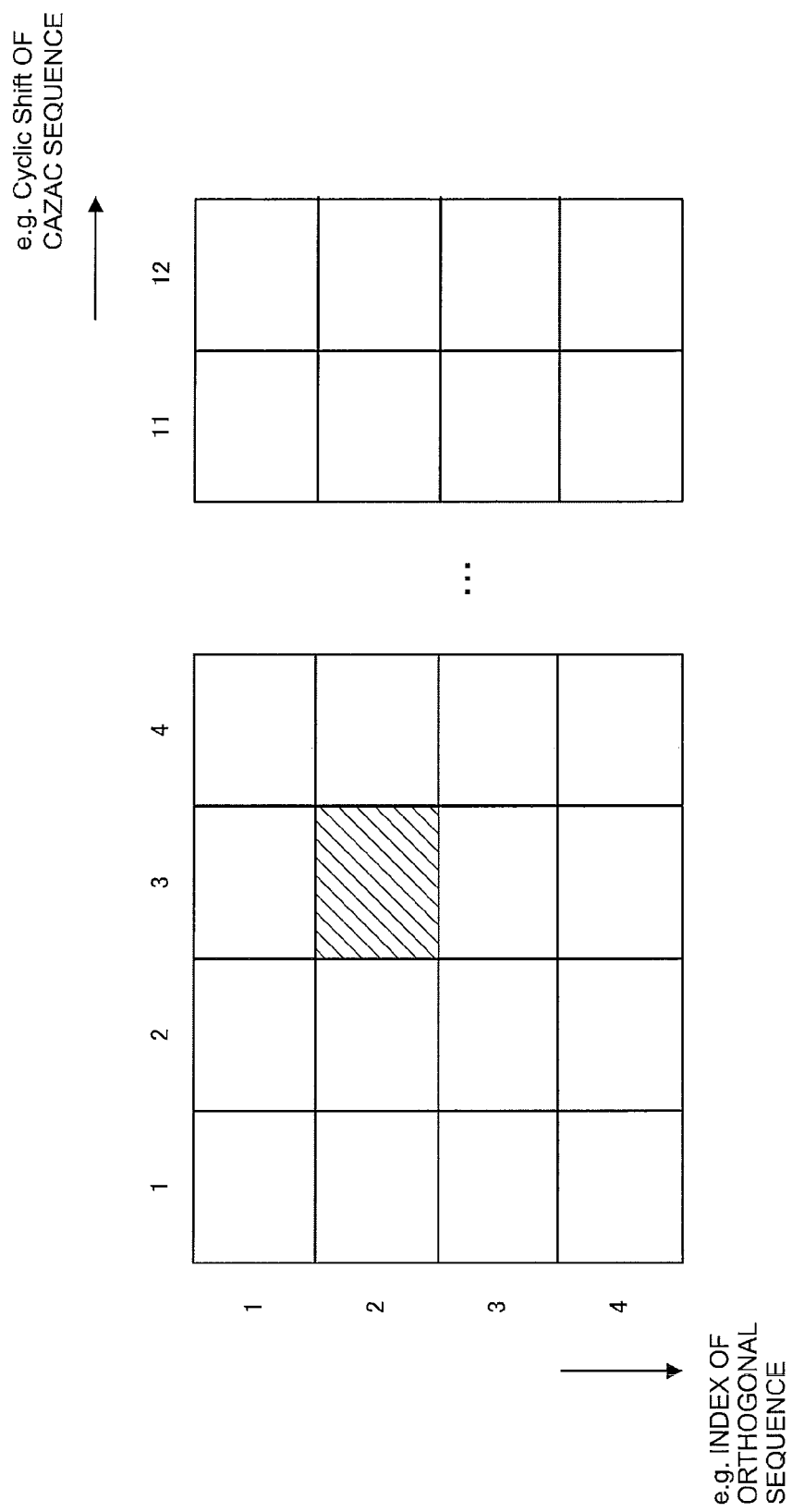
FIG. 8 is a diagram showing still another configuration example of orthogonal resources of the physical uplink control channel.

Similarly, FIG. 8 conceptually shows a configuration example of orthogonal resources of a PUCCH used by the mobile station apparatus 200 in transmitting uplink control information. In FIG. 8, as a configuration example of the orthogonal resource, the horizontal direction represents the cyclic shift of CAZAC sequence, and the vertical direction represents the index of orthogonal sequence (showing cyclic shifts of CAZAC sequence represented by the numbers of "1" to "12", and indexes of orthogonal sequences represented by the numbers of "1" to "4").

For example, the mobile station apparatus 200 transmits the uplink control information, using the orthogonal resource (the orthogonal resource with the number of cyclic shifts of CAZAC sequence being "3" and with the index of orthogonal sequence being "2" shown by diagonal lines) of the PUCCH. In other words, the mobile station apparatus 200 applies the cyclic shift of CAZAC sequence in the frequency domain and the orthogonal sequence in the time domain to the PUCCH to orthogonalize resource, and is capable of transmitting the uplink control information using orthogonalized resource.

In FIG. 5, using the orthogonal resource of the PUCCH configured by the aforementioned configuration method, the mobile station apparatus 200 transmits the uplink control information (that may be the HARQ control information) to the base station apparatus 100, using the first transmission format or the second transmission format.

For example, using the orthogonal resource of the PUCCH configured by the orthogonal sequence as shown in FIG. 7, the mobile station apparatus 200 is capable of transmitting the uplink control information using the first transmission format. Further, for example, using the orthogonal resource of the PUCCH configured by the cyclic shift of CAZAC sequence and the orthogonal sequence as shown in FIG. 8, the mobile station apparatus 200 is capable of transmitting the uplink control information using the second transmission format.

Herein, in the mobile communication system, the number of resources capable of being orthogonalized is related to the number of mobile station apparatuses 200 (the number of mobile station apparatuses 200 capable of being multiplexed) to which the information can be transmitted at a certain timing. For example, as shown in FIG. 6, in case that the cyclic shifts of CAZAC sequence in orthogonal resources are "12", it is possible to multiplex up to 12 mobile station apparatuses 200. Similarly, for example, as shown in FIG. 7, in case that the indexes of orthogonal sequences in orthogonal resources are "5", it is possible to multiplex up to 5 mobile station apparatuses 200. Similarly, for example, as shown in FIG. 8, in case that the cyclic shifts of CAZAC sequence in orthogonal resources are "12", and the indexes of orthogonal sequences are "4", it is possible to multiplex up to 48 (12×4) mobile station apparatuses 200.

The base station apparatus 100 considers status of downlink resources and status of uplink resources, the number of mobile station apparatuses 200 that perform communications using a plurality of component carriers, the number of mobile station apparatuses 200 that perform communications using one component carrier, etc., and is thereby capable of designating the configuration methods of orthogonal resources of the first transmission format and/or the second transmission format for the mobile station apparatus 200 to transmit the uplink control information.

Herein, as described above, the base station apparatus 100 is also capable of transmitting information (that may be information with regard to the orthogonal resource) for indicating the orthogonal resource, as the first parameter for designating the first region for enabling the mobile station apparatus 200 to use the PUCCH, and the second parameter for designating the second region for enabling the mobile station apparatus 200 to use the PUCCH.

Further, the base station apparatus 100 is also capable of transmitting the information (that may be information with regard to the orthogonal resource) for indicating the orthogonal resource, as the first parameter for designating the first region for enabling the mobile station apparatus 200 to use the first transmission format, and the second parameter for designating the second region for enabling the mobile station apparatus 200 to use the second transmission format.

For example, the base station apparatus 100 transmits the number of cyclic shifts (a cyclic shift number) of CAZAC sequence and the index of orthogonal sequence to the mobile station apparatus 200, as the first parameter and the second parameter. The base station apparatus 100 thus transmits the number of cyclic shifts (the cyclic shift number) of CAZAC sequence and the index of orthogonal sequence to the mobile station apparatus 200, as the first parameter and the second parameter, and is thereby capable of designating resource for the mobile station apparatus 200 to transmit the uplink control information, more flexibly.

Further, for example, the base station apparatus 100 is capable of designating regions up to the number of cyclic shifts of CAZAC sequence being "3" as the first region for enabling use of the PUCCH. Furthermore, for example, the base station apparatus 100 is capable of designating regions up to the index of orthogonal sequence being "2" as the first region for enabling use of the PUCCH. Still furthermore, for example, the base station apparatus 100 is capable of designating regions up to the number of cyclic shifts of CAZAC sequence being "3" and the index of orthogonal sequence being "2" as the first region for enabling use of the PUCCH.

Moreover, as the first transmission format, the mobile station apparatus 200 is capable of using a transmission format for enabling the HARQ control information and the CQI to be transmitted together (simultaneously). In other words, the mobile station apparatus 200 is capable of simultaneously transmitting the HARQ control information and the CQI using the first transmission format. For example, the mobile station apparatus 200 simultaneously transmits the HARQ control information i for the PDCCHs on respectively the DCC1, the DCC2 and the DCC3 and/or the downlink transport blocks transmitted on the PDSCHs, and the CQI.

The mobile station apparatus 200 thus uses the transmission format for enabling the HARQ control information and the CQI to be simultaneously transmitted, as the first transmission format, and is capable of transmitting the uplink control information (the HARQ control information and the CQI), using the PUCCH assigned by the base station apparatus 100 more efficiently.

Further, as the first transmission format, the mobile station apparatus 200 is capable of using a transmission format for enabling the HARQ control information and the scheduling request to be transmitted together (simultaneously). In other words, the mobile station apparatus 200 is capable of simultaneously transmitting the HARQ control information and the scheduling request using the first transmission format. For example, the mobile station apparatus 200 simultaneously transmits the HARQ control information for the PDCCHs on respectively the DCC1, the DCC2 and the DCC3 and/or the downlink transport blocks transmitted on the PDSCHs, and the scheduling request.

The mobile station apparatus 200 thus uses the transmission format for enabling the HARQ control information and the scheduling request to be simultaneously transmitted, as the first transmission format, and is capable of transmitting the uplink control information (the HARQ control information and the scheduling request), using the PUCCH assigned by the base station apparatus 100 more efficiently.

As described above, in Embodiment 1, the base station apparatus 100 designates the first region and the second region for enabling the mobile station apparatus 200 to use the PUCCH, and the mobile station apparatus 200 transmits the HARQ control information, using the PUCCH resource in the first region or the PUCCH resource in the second region corresponding to the search space in which the PDCCH is detected. In case that the mobile station apparatus 200 detects a plurality of PDCCHs in the user equipment-specific search space and/or the common search space, the mobile station apparatus 200 transmits the HARQ control information using the PUCCH resource in the first region. Meanwhile, in case that the mobile station apparatus 200 detects one PDCCH in the user equipment-specific search space and/or the common search space, the mobile station apparatus 200 transmits the HARQ control information using the PUCCH resource in the first region or the PUCCH resource in the second region.

The base station apparatus 100 and the mobile station apparatus 200 thus transmit and receive the HARQ control information, and are capable of performing transmission and reception of the HARQ control information using uplink resources efficiently. For example, the mobile station apparatus 200, which communicates with the base station apparatus 100 using a plurality of component carriers, transmits the HARQ control information for a plurality of PDCCHs and/or a plurality of downlink transport blocks, using the PUCCH resource in the first region designated from the base station apparatus 100, and is thereby capable of performing transmission of the HARQ control information using uplink resources efficiently.

Further, in case that the mobile station apparatus 200 detects one PDCCH in the user equipment-specific search space, the mobile station apparatus 200 transmits the HARQ control information using the PUCCH resource in the first region. Meanwhile, in case that the mobile station apparatus 200 detects one PDCCH in the common search space, the mobile station apparatus 200 transmits the HARQ control information using the PUCCH resource in the second region.

The base station apparatus 100 and the mobile station apparatus 200 thus transmit and receive the HARQ control information, and are capable of performing transmission and reception of the HARQ control information at least in case that the PDCCH is allocated in the common search space.

For example, under circumstances where a mismatch of the number of component carriers used in communications occurs between the base station apparatus 100 and the mobile station apparatus 200 (for example, circumstances where the base station apparatus 100 considers that communications are performed using five DCCs, and the mobile station apparatus 200 considers that communications are performed using three DCCs), the base station apparatus 100 allocates the PDCCH in the common search space, it is thereby possible to perform transmission and reception of the HARQ control information, and it is possible to continue communications between the base station apparatus 100 and the mobile station apparatus 200.

The base station apparatus 100 transmits, to the mobile station apparatus 200, the first parameter for designating the first region and the second parameter for designating the second region, is thereby capable of designating each space corresponding to status in the managed cell (downlink resources and uplink resources, the number of mobile station apparatuses 200 that perform communications using a plurality of component carriers, the number of mobile station apparatuses 200 that perform communications using one component carrier, etc.), and is able to perform more flexible transmission control of the HARQ control information.

Further, the mobile station apparatus 200, which communicates with the base station apparatus 100 using a plurality of component carriers, transmits the HARQ control information for a plurality of PDCCHs and/or a plurality of downlink transport blocks, using the first transmission format, and is thereby capable of performing transmission control of the HARQ control information using uplink resources more efficiently.

Furthermore, the mobile station apparatus 200 transmits the HARQ control information using the first transmission format and the second transmission format, and the base station apparatus 100 is thereby capable of performing more flexible transmission control of the HARQ control information. In other words, the base station apparatus 100 is capable of performing transmission control of the HARQ control information in consideration of the information amount of the HARQ control information that the mobile station apparatus 200 transmits, the number of mobile station apparatuses 200 that transmit the HARQ control information in a certain timing, etc.

Embodiment 2

Embodiment 2 of the invention will be described next. In Embodiment 2, the base station apparatus 100 transmits a first parameter for designating a first region in which the mobile station apparatus 200 is capable of using the PUCCH to the mobile station apparatus 200, and further transmits a plurality of parameters for designating a plurality of regions different from the first region in which the mobile station apparatus 200 is capable of using the PUCCH to the mobile station apparatus 200, and corresponding to the search space in which the mobile station apparatus 200 detects the PDCCH, the mobile station apparatus 200 transmits the HARQ control information to the base station apparatus 100 using the first region or any region of the plurality of regions.

Further, the base station apparatus 100 transmits a first parameter for designating a first region in which the mobile station apparatus 200 is capable of using the PUCCH to the mobile station apparatus 200, and further transmits a second parameter for designating any region of a plurality of regions different from the first region in which the mobile station apparatus 200 is capable of using the PUCCH to the mobile station apparatus 200, and the mobile station apparatus 200 transmits the HARQ control information to the base station apparatus 100 using the first region in case of detecting a plurality of PDCCHs in the user equipment-specific search space and/or the common search space, while transmitting the HARQ control information to the base station apparatus 100 using the first region or any region of the plurality of regions in case of detecting one PDCCH in the user equipment-specific search space and/or the common search space.

Furthermore, the base station apparatus 100 transmits a first parameter for designating a first region in which the mobile station apparatus 200 is capable of using the PUCCH to the mobile station apparatus 200, and further transmits a second parameter for designating a plurality of regions different from the first region in which the mobile station apparatus 200 is capable of using the PUCCH to the mobile station apparatus 200, and the mobile station apparatus 200 transmits the HARQ control information to the base station apparatus 100 using the first region in case of detecting one PDCCH in the user equipment-specific search space, while transmitting the HARQ control information to the base station apparatus 100 using any region of the plurality of regions in case of detecting one PDCCH in the common search space.

Still furthermore, the base station apparatus 100 transmits a first parameter for designating a first region in which the mobile station apparatus 200 is capable of using the PUCCH to the mobile station apparatus 200, and further transmits a second parameter for designating a plurality of regions different from the first region in which the mobile station apparatus 200 is capable of using the PUCCH to the mobile station apparatus 200, and the mobile station apparatus 200 transmits the HARQ control information to the base station apparatus 100 using the first region in case of detecting a plurality of PDCCHs in the user equipment-specific search space and/or the common search space or detecting one PDCCH in the user equipment-specific search space, while transmitting the HARQ control information to the base station apparatus 100 using any region of the plurality of regions in case of detecting one PDCCH in the common search space.

Moreover, the base station apparatus 100 transmits a first parameter for designating a first region in which the mobile station apparatus 200 is capable of using a first transmission format to the mobile station apparatus 200, and further transmits a second parameter for designating a plurality of regions different from the first region in which the mobile station apparatus 200 is capable of using a second transmission format to the mobile station apparatus 200, and corresponding to the search space in which the mobile station apparatus 200 detects the PDCCH, the mobile station apparatus 200 transmits the HARQ control information to the base station apparatus 100 using the first transmission format or the second transmission format.

Further, the base station apparatus 100 transmits a first parameter for designating a first region in which the mobile station apparatus 200 is capable of using a first transmission format to the mobile station apparatus 200, and further transmits a second parameter for designating a plurality of regions different from the first regions in which the mobile station apparatus 200 is capable of using a second transmission format to the mobile station apparatus 200, and the mobile station apparatus 200 transmits the HARQ control information to the base station apparatus 100 using the first transmission format in case of detecting a plurality of PDCCHs in the user equipment-specific search space and/or the common search space, while transmitting the HARQ control information to the base station apparatus 100 using the first transmission format or the second transmission format in case of detecting one PDCCH in the user equipment-specific search space and/or the common search space.

Furthermore, the base station apparatus 100 transmits a first parameter for designating a first region in which the mobile station apparatus 200 is capable of using a first transmission format to the mobile station apparatus 200, and further transmits a second parameter for designating a plurality of regions different from the first region in which the mobile station apparatus 200 is capable of using a second transmission format to the mobile station apparatus 200, and the mobile station apparatus 200 transmits the HARQ control information to the base station apparatus 100 using the first transmission format in case of detecting one PDCCH in the user equipment-specific search space, while transmitting the HARQ control information to the base station apparatus 100 using the second transmission format in case of detecting one PDCCH in the common search space.

Still furthermore, the base station apparatus 100 transmits a first parameter for designating a first region in which the mobile station apparatus 200 is capable of using a first transmission format to the mobile station apparatus 200, and further transmits a second parameter for designating a plurality of regions different from the first region in which the mobile station apparatus 200 is capable of using a second transmission format to the mobile station apparatus 200, and the mobile station apparatus 200 transmits the HARQ control information to the base station apparatus 100 using the first transmission format in case of detecting a plurality of PDCCHs in the user equipment-specific search space and/or the common search space or detecting one PDCCH in the user equipment-specific search space, while transmitting the HARQ control information to the base station apparatus 100 using the second transmission format in the case of detecting one PDCCH in the common search space.

Herein, the mobile station apparatus 200 detecting a PDCCH means that the mobile station apparatus 200 detects the PDCCH for the mobile station apparatus 200 itself. Further, the HARQ control information transmitted from the mobile station apparatus 200 includes information indicative of ACK/NACK for the PDCCH and/or the downlink transport block transmitted from the base station apparatus 100 and/or information indicative of DTX. The information indicative of DTX is information indicating that the mobile station apparatus 200 was not able to detect the PDCCH transmitted from the base station apparatus 100 (or may be information indicating whether the mobile station apparatus 200 was able to detect the PDCCH).

Figure 9:
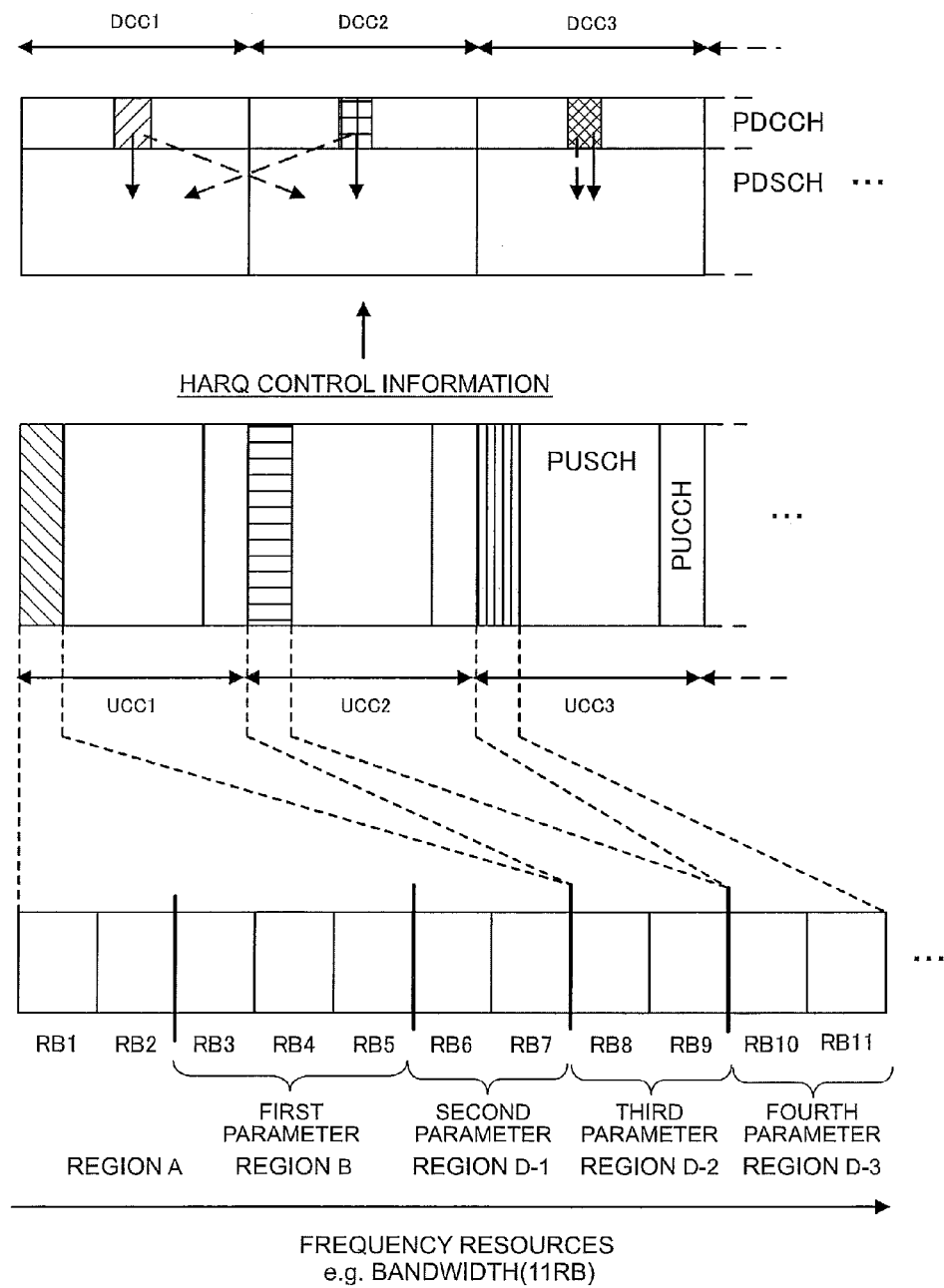
FIG. 9 is a diagram showing an example of a mobile communication system to which Embodiment 2 is applicable.
Figure 10:
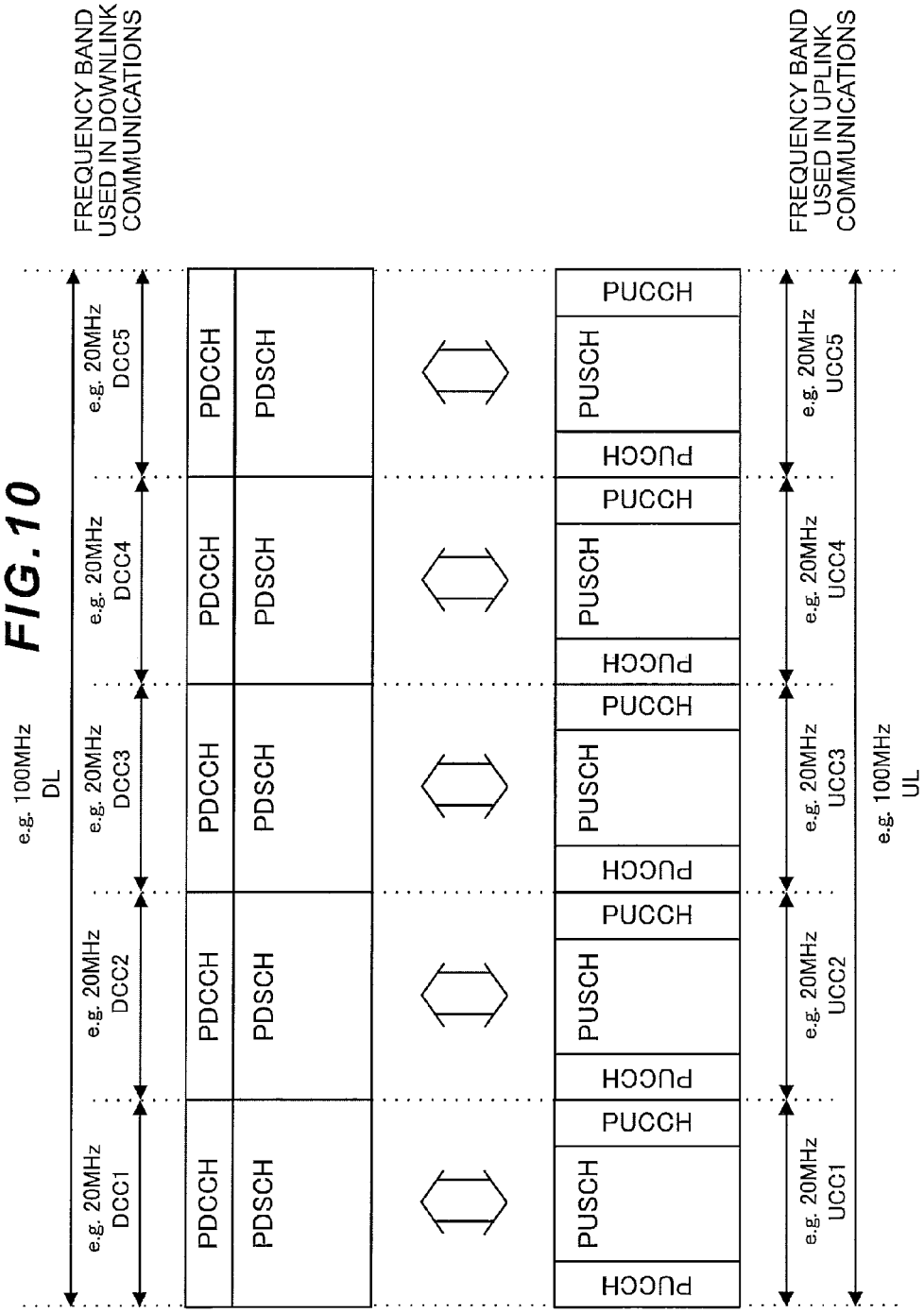
FIG. 10 is a diagram showing an example of carrier aggregation in conventional techniques.
Figure 11:
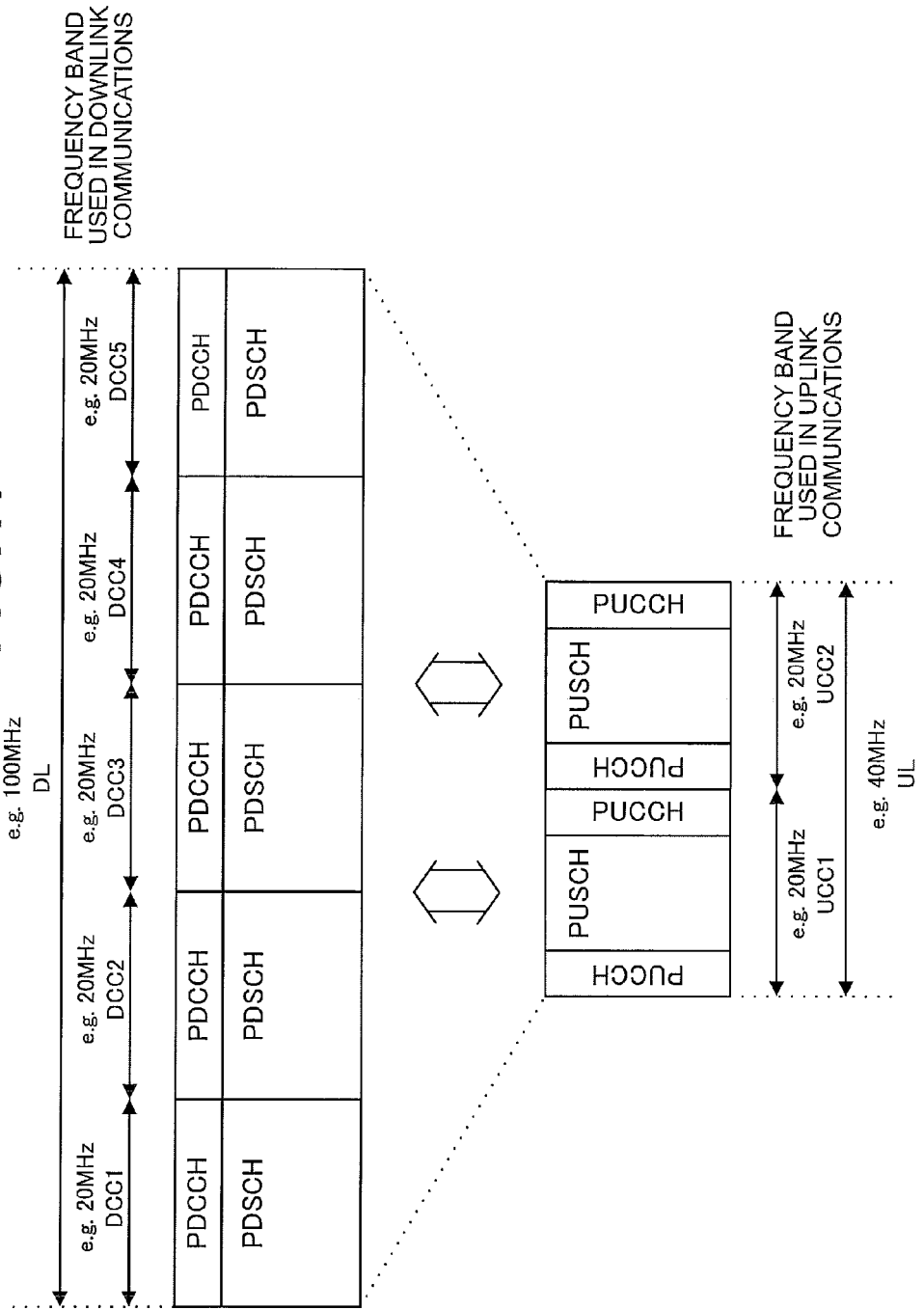
FIG. 11 is a diagram showing an example of asymmetric carrier aggregation in the conventional techniques.
Figure 12:
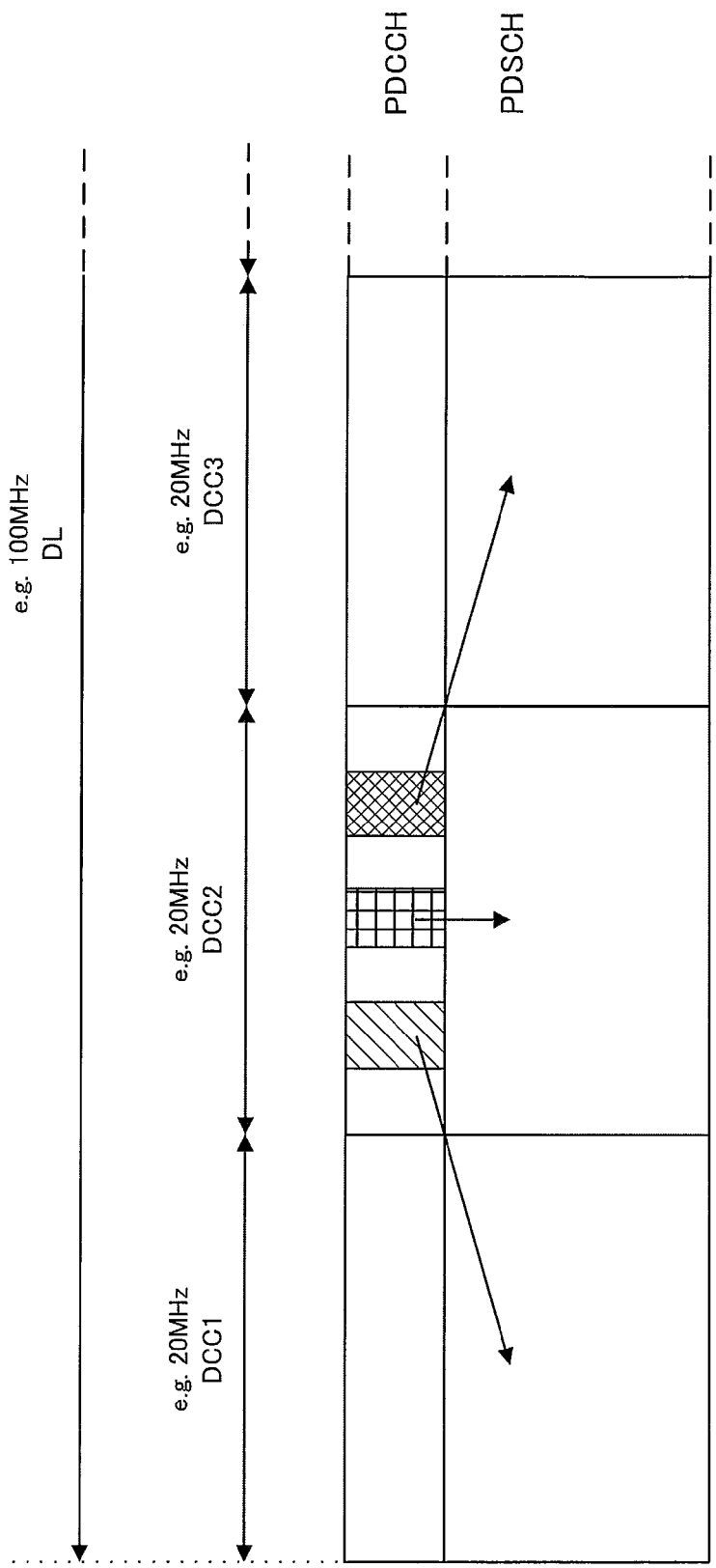
FIG. 12 is a diagram to explain an example of a method of assigning a physical downlink shared channel using a physical downlink control channel in the conventional techniques.

FIG. 9 is a diagram showing an example of a mobile communication system to which Embodiment 2 is applicable. Embodiment 2 is applicable to both a mobile communication system of symmetric carrier aggregation and a mobile communication system of asymmetric carrier aggregation. Further, in the following description, only an enlarged part of component carriers are described, but as a matter of course, it is possible to apply the Embodiment to all component carriers.

As an example to explain Embodiment 2, FIG. 9 shows three downlink component carriers (DCC1, DCC2 and DCC3). Further, FIG. 9 shows three uplink component carriers (UCC1, UCC2 and UCC3). In FIG. 9, as described in Embodiment 1, the base station apparatus 100 and the mobile station apparatus 200 perform uplink/downlink communications using the PDCCH, PDCCH, PUSCH, PUCCH, etc.

In FIG. 9, the regions extending by dotted lines from the PUCCH (PUCCH resource region shown by diagonal lines from top left to bottom right) on the UCC1, the PUCCH (PUCCH resource region shown by horizontal lines) on the UCC2, and the PUCCH (PUCCH resource region shown by vertical lines) on the UCC3 conceptually show PUCCHs on the UCC1, the UCC2 and the UCC3, respectively. Herein, to make the description easy to understand, the horizontal direction represents frequency resources (or may represent the bandwidth), and orthogonal resources, as described above, are not described.

Herein, to make the description easy to understand, FIG. 9 shows that PUCCH resource regions are mapped respectively on uplink component carriers, but the PUCCH resource regions may be mapped on one uplink component carrier. For example, each of the PUCCH resource regions may be mapped on an uplink component carrier set, by the base station apparatus 100, as an uplink component carrier on which the mobile station apparatus 200 transmits the HARQ control information.

As described in Embodiment 1, the base station apparatus 100 transmits the first parameter for designating the first region (region B shown by from RB3 to RB5) for enabling the mobile station apparatus 200 to use the PUCCH. Similarly, the base station apparatus 100 transmits the second parameter for designating the second region (region D-1 shown by RB6 and RB7) for enabling the mobile station apparatus 200 to use the PUCCH. Similarly, the base station apparatus 100 transmits a third parameter for designating a third region (region D-2 shown by RB8 and RB9) for enabling the mobile station apparatus 200 to use the PUCCH. Similarly, the base station apparatus 100 transmits a fourth parameter for designating a fourth region (region D-3 shown by RB10 and RB11) for enabling the mobile station apparatus 200 to use the PUCCH.

Herein, in FIG. 9, as an example, the base station apparatus 100 designates regions up to the fourth region for the mobile station apparatus 200, but the number of regions designated by the base station apparatus 100 varies corresponding to the number of downlink component carriers used by the base station apparatus 100 and the mobile station apparatus 200 in communications.

Further, as described in Embodiment 1, the base station apparatus 100 is capable of setting an uplink component carrier for the mobile station apparatus 200 to transmit the HARQ control information. In FIG. 9, the base station apparatus 100 sets the UCC1 as an uplink component carrier for the mobile station apparatus 200 to transmit the HARQ control information.

Furthermore, as described in Embodiment 1, the base station apparatus 100 assigns the PUCCH resource for the mobile station apparatus 200 to transmit the HARQ control information to the mobile station apparatus 200. The mobile station apparatus 200 transmits the HARQ control information to the base station apparatus 100, using the PUCCH resource assigned by the base station apparatus 100.

Herein, the mobile station apparatus 200 transmits the HARQ control information to the base station apparatus 100, using the PUCCH resource in the first region or the PUCCH resource in any region of a plurality of regions corresponding to the search space in which the mobile station apparatus 200 detects the PDCCH in a certain subframe. In other words, the base station apparatus 100 allocates the PDCCH in the search space (search space existing within the PDCCH resource region), and using the first region or any region of the plurality of regions corresponding to the search space in which the PDCCH is detected, the mobile station apparatus 200 transmits the HARQ control information to the base station apparatus 100. Further, using the region A (region A shown by RB1 and RB2), for example, the mobile station apparatus 200 transmits the CSI and the CQI to the base station apparatus 100.

Further, in case that the mobile station apparatus 200 detects a plurality of PDCCHs in the user equipment-specific search space and/or the common search space in a certain subframe, the mobile station apparatus 200 transmits the HARQ control information using the first region. In other words, the base station apparatus 100 allocates a plurality of PDCCHs in the user equipment-specific search space and/or the common search space, and in case that the mobile station apparatus 200 detects a plurality of PDCCHs in the user equipment-specific search space and/or the common search space, the mobile station apparatus 200 transmits the HARQ control information using the first region.

For example, in FIG. 9, in case that the mobile station apparatus 200 detects a plurality of PDCCHs in the user equipment-specific search space and/or the common search space of each of the DCC1, the DCC2 and the DCC3, the mobile station apparatus 200 transmits the HARQ control information using the first region. Further, for example, in case that the mobile station apparatus 200 detects a plurality of PDCCHs in the user equipment-specific search space and/or the common search space of the DCC2, the mobile station apparatus 200 transmits HARQ the control information using the first region.

Further, in case that the mobile station apparatus 200 detects one PDCCH in the user equipment-specific search space and/or the common search space in a certain subframe, the mobile station apparatus 200 transmits the HARQ control information using the first region or any region (the second region, the third region or the fourth region) of a plurality of regions. In other words, the base station apparatus 100 allocates one PDCCH in the user equipment-specific search space and/or the common search space, and in case that the mobile station apparatus 200 detects one PDCCH in the user equipment-specific search space and/or the common search space, the mobile station apparatus 200 transmits the HARQ control information, using the first region or any region of the plurality of regions.

Herein, in case that the mobile station apparatus 200 detects one PDCCH in the user equipment-specific search space, the mobile station apparatus 200 transmits the HARQ control information using the first region. In other words, the base station apparatus 100 allocates one PDCCH in the user equipment-specific search space, and in case that the mobile station apparatus 200 detects one PDCCH in the user equipment-specific search space, the mobile station apparatus 200 transmits the HARQ control information using the first region.

Meanwhile, in case that the mobile station apparatus 200 detects one PDCCH in the common search space, the mobile station apparatus 200 transmits the HARQ control information using any region (the second region, the third region or the fourth region) of the plurality of regions. In other words, the base station apparatus 100 allocates one PDCCH in the common search space, and in case that the mobile station apparatus 200 detects one PDCCH in the common search space, the mobile station apparatus 200 transmits the HARQ control information using any region (the second region, the third region or the fourth region) of the plurality of regions.

For example, in FIG. 9, in case that the mobile station apparatus 200 detects one PDCCH in the user equipment-specific search space of the DCC1, the mobile station apparatus 200 transmits the HARQ control information using the first region. Further, for example, in case that the mobile station apparatus 200 detects one PDCCH in the user equipment-specific search space of the DCC2, the mobile station apparatus 200 transmits the HARQ control information using the first region. Furthermore, for example, in case that the mobile station apparatus 200 detects one PDCCH in the user equipment-specific search space of the DCC3, the mobile station apparatus 200 transmits the HARQ control information using the first region.

Further, in FIG. 9, in case that the mobile station apparatus 200 detects one PDCCH in the common search space of the DCC1, the mobile station apparatus 200 transmits the HARQ control information using the second region (any region of the plurality of regions). Furthermore, for example, in case that the mobile station apparatus 200 detects one PDCCH in the common search space of the DCC2, the mobile station apparatus 200 transmits the HARQ control information using the third region (any region of the plurality of regions). Still furthermore, for example, in case that the mobile station apparatus 200 detects one PDCCH in the common search space of the DCC3, the mobile station apparatus 200 transmits the HARQ control information using the fourth region (any region of the plurality of regions).

Herein, as described in Embodiment 1, the base station apparatus is capable of associating the downlink component carriers with the uplink component carriers. FIG. 9 shows that the base station apparatus 100 associates the DCC1 with the UCC1, the DCC2 with the UCC2, and the DCC3 with the UCC3. In other words, the mobile station apparatus 200 transmits the HARQ control information to the base station apparatus 100, using the PUCCH resource region on the uplink component carrier associated with the downlink component carrier.

Herein, incase that the mobile station apparatus 200 transmits the HARQ control information on an uplink component carrier set, by the base station apparatus 100, as an uplink component carrier for the mobile station apparatus 200 to transmit the HARQ control information, the PUCCH resource regions (the second region, the third region and the fourth region) respectively associated with the downlink component carriers are allocated on the set uplink component carrier.

In other words, the base station apparatus 100 transmits a plurality of parameters for designating a plurality of regions (the second region, the third region and the fourth region) for enabling the mobile station apparatus 200 to use the PUCCH on the uplink component carrier set on the mobile station apparatus 200. in case that the mobile station apparatus 200 detects one PDCCH in the common search space, the mobile station apparatus 200 transmits the HARQ control information, using any region of the plurality of regions on the uplink component carrier set by the base station apparatus 100. Herein, the plurality of PUCCH resource regions designated by the base station apparatus 100 is associated with respective downlink component carriers.

For example, the base station apparatus 100 includes the offset (associated with the downlink component carrier) specific to the downlink component carrier in a plurality of parameters to transmit to the mobile station apparatus 200, and is capable of designating the plurality of PUCCH resource regions for the mobile station apparatus 200.

In other words, in FIG. 9, the mobile station apparatus 200 transmits the HARQ control information for the PDCCH transmitted on the DCC1 and/or the downlink transport block, using the PUCCH resource in the PUCCH resource region (second region) associated with the DCC1. Further, the mobile station apparatus 200 transmits the HARQ control information for the PDCCH transmitted on the DCC2 and/or the downlink transport block, using the PUCCH resource in the PUCCH resource region (third region) associated with the DCC2. Furthermore, the mobile station apparatus 200 transmits the HARQ control information for the PDCCH transmitted on the DCC3 and/or the downlink transport block, using the PUCCH resource in the PUCCH resource region (fourth region) associated with the DCC3.

In other words, in case that the mobile station apparatus 200 detects the PDCCH in the common search space of the DCC1, the mobile station apparatus 200 transmits the HARQ control information in HARQ, using the PUCCH resource in the PUCCH resource region (second region, any region of the plurality of regions) associated with the DCC1, which is mapped on the uplink component carrier set by the base station apparatus 100. Further, in case that the mobile station apparatus 200 detects the PDCCH in the common search space of the DCC2, the mobile station apparatus 200 transmits the HARQ control information, using the PUCCH resource in the PUCCH resource region (third region, any region of the plurality of regions) associated with the DCC2, which is mapped on the uplink component carrier set by the base station apparatus 100. Furthermore, incase that the mobile station apparatus 200 detects the PDCCH in the common search space of the DCC3, the mobile station apparatus 200 transmits the HARQ control information, using the PUCCH resource in the PUCCH resource region (fourth region, any region of the plurality of regions) associated with the DCC3, which is mapped on the uplink component carrier set by the base station apparatus 100.

As described above, the mobile station apparatus 200 transmits the HARQ control information for a plurality of PDCCHs detected in the user equipment-specific search space and/or the common search space and/or the downlink transport blocks transmitted on a plurality of PDSCHs (assigned by a plurality of PDCCHs) to the base station apparatus 100, using the first region.

Further, the mobile station apparatus 200 transmits the HARQ control information for one PDCCH detected in the user equipment-specific search space and/or the downlink transport block transmitted on one PDCCH (assigned by one PDCCH) to the base station apparatus 100, using the first region.

In other words, in case that the mobile station apparatus 200 detects a plurality of PDCCHs in the user equipment-specific search space and/or the common search space in a certain subframe, or in case that the mobile station apparatus 200 detects one PDCCH in the user equipment-specific search space, the mobile station apparatus 200 transmits the HARQ control information using the first region.

Further, the mobile station apparatus 200 transmits the HARQ control information for one PDCCH detected in the common search space and/or the downlink transport block transmitted on one PDSCH (assigned by one PDCCH) to the base station apparatus 100, using any region of the plurality of regions.

Herein, in case that one PDCCH detected in the common search space in a certain subframe is used to assign one PDSCH on the specific downlink component carrier, the mobile station apparatus 200 may transmit the HARQ control information to the base station apparatus 100, using any region (the second region, the third region or the fourth region) of the plurality of regions.

The base station apparatus 100 is capable of setting the specific downlink component carrier on the mobile station apparatus 200. In other words, in case that the base station apparatus 100 assigns (schedules) one PDSCH on the specific downlink component carrier set on the mobile station apparatus 200, using one PDCCH in the common search space, and the mobile station apparatus 200 detects, in the common search space, the PDCCH which is used to assign the PDSCH on the specific downlink component carrier set by the base station apparatus 100, the mobile station apparatus 200 may transmit the HARQ control information using any region of the plurality of regions.

For example, the base station apparatus 100 is capable of setting the specific downlink component carrier on the mobile station apparatus 200 specifically for the cell, using the broadcast information (the broadcast channel). Further, for example, the base station apparatus 100 is capable of setting the specific downlink component carrier on the mobile station apparatus 200 specifically for the mobile station apparatus, using the RRC signaling.

In other words, in case that the mobile station apparatus 200 detects one PDCCH, which is used to assign one PDSCH on except for the specific downlink component carrier set by the base station apparatus 100, in the common search space, the mobile station apparatus 200 transmits the HARQ control information using the first region. Meanwhile, in case that the mobile station apparatus 200 detects one PDCCH, which is used to assign one PDSCH on the specific downlink component carrier set by the base station apparatus 100, in the common search space, the mobile station apparatus 200 transmits the HARQ control information using any region of the plurality of regions.

Further, the base station apparatus 100 and the mobile station apparatus 200 are capable of setting, as the specific downlink component carrier, a downlink component carrier associated with an uplink component carrier set, by the base station apparatus 100, as an uplink component carrier on which the HARQ control information is transmitted.

In other words, in case that the mobile station apparatus 200 detects one PDCCH, which is used to assign one PDSCH on except for the downlink component carrier associated with the uplink component carrier set by the base station apparatus 100 as an uplink component carrier on which the HARQ control information is transmitted, in the common search space, the mobile station apparatus 200 transmits the HARQ control information using the first region.

Meanwhile, incase that the mobile station apparatus 200 detects one PDCCH, which is used to assign one PDSCH on the downlink component carrier associated with the uplink component carrier set by the base station apparatus 100 as an uplink component carrier on which the HARQ control information is transmitted, in the common search space, the mobile station apparatus 200 transmits the HARQ control information using any region of the plurality of regions.

For example, in FIG. 9, in case that the DCC1 is associated with the UCC1 by the broadcast information (the broadcast channel) or the RRC signaling from the base station apparatus 100, and the PDCCH detected in the common search space of the DCC1 and/or the DCC2 and/or the DCC3 is used to assign (schedule) the PDSCH on except for the DCC1, the mobile station apparatus 200 may transmit the HARQ control information using the first region.

Meanwhile, for example, in FIG. 9, in case that the DCC1 is associated with the UCC1 by the broadcast information (the broadcast channel) or the RCC signaling from the base station apparatus 100, and the PDCCH detected in the common search space of the DCC1 and/or the DCC2 and/or the DCC3 is used to assign (schedule) the PDSCH on the DCC1, the mobile station apparatus 200 may transmit the HARQ control information using any region of the plurality of regions.

Herein, in case that the PDCCH detected in the common search space of the DCC1 is used to assign the PDSCH on the DCC1, the mobile station apparatus 200 may transmit the HARQ control information using the second region. Further, in case that the PDCCH detected in the common search space of the DCC2 is used to assign the PDSCH on the DCC1, the mobile station apparatus 200 may transmit the HARQ control information using the third region. Furthermore, in case that the PDCCH detected in the common search space of the DCC3 is used to assign the PDSCH on the DCC1, the mobile station apparatus 200 may transmit the HARQ control information using the fourth region.

Herein, as described above, in FIG. 9, the base station apparatus 100 sets the UCC1 as the uplink component carrier for the mobile station apparatus 200 to transmit the HARQ control information.

Further, in FIG. 9, in case that the mobile station apparatus 200 transmits the HARQ control information using the first region, the mobile station apparatus 200 transmits the HARQ control information to the base station apparatus 100, using the first transmission format. Furthermore, in case that the mobile station apparatus 200 transmits the HARQ control information using any region of the plurality of regions, the mobile station apparatus 200 transmits the HARQ control information to the base station apparatus 100, using the second transmission format.

In other words, in case that the mobile station apparatus 200 detects a plurality of PDCCHs in the user equipment-specific search space and/or the common search space in a certain subframe, the mobile station apparatus 200 transmits the HARQ control information using the first transmission format. Meanwhile, in case that the mobile station apparatus 200 detects one PDCCH in the user equipment-specific search space and/or the common search space in a certain subframe, the mobile station apparatus 200 transmits the HARQ control information using the first transmission format or the second transmission format.

Further, in case that the mobile station apparatus 200 detects one PDCCH in the user equipment-specific search space in a certain subframe, the mobile station apparatus 200 transmits the HARQ control information using the first transmission format. In other words, in case that the mobile station apparatus 200 detects a plurality of PDCCHs in the user equipment-specific search space and/or the common search space in a certain subframe, or in case that the mobile station apparatus 200 detects one PDCCH in the user equipment-specific search space, the mobile station apparatus 200 transmits the HARQ control information using the first transmission format.

Meanwhile, in case that the mobile station apparatus 200 detects one PDCCH in the common search space in a certain subframe, the mobile station apparatus 200 transmits the HARQ control information using the second transmission format. Herein, in case that one PDCCH detected in the common search space in a certain subframe is used to assign one PDSCH on the specific downlink component carrier, the mobile station apparatus 200 may transmit the HARQ control information using the second transmission format.

Herein, the first transmission format and the second transmission format are the same as described in Embodiment 1, and descriptions thereof are omitted.

As described above, in Embodiment 2, the base station apparatus 100 designates the first region and a plurality of regions for enabling the mobile station apparatus 200 to use the PUCCH, and the mobile station apparatus 200 transmits the HARQ control information, using the PUCCH resource in the first space or the PUCCH resource in any region of the plurality of regions corresponding to the search space in which the PDCCH is detected.

In case that the mobile station apparatus 200 detects a plurality of PDCCHs in the user equipment-specific search space and/or the common search space, the mobile station apparatus 200 transmits the HARQ control information using the first region. Meanwhile, incase that the mobile station apparatus 200 detects one PDCCH in the user equipment-specific search space and/or the common search space, the mobile station apparatus 200 transmits the HARQ control information using the first region or any region of the plurality of regions.

The base station apparatus 100 and the mobile station apparatus 200 thus transmit and receive the HARQ control information, and are capable of performing transmission and reception of the HARQ control information using uplink resources efficiently. For example, the mobile station apparatus 200, which communicates with the base station apparatus 100 using a plurality of component carriers, transmits the HARQ control information for a plurality of PDCCHs and/or a plurality of downlink transport blocks, using the PUCCH resource in the first region designated from the base station apparatus 100, and is thereby capable of performing transmission of the HARQ control information using uplink resources efficiently.

Further, in case that the mobile station apparatus 200 detects one PDCCH in the user equipment-specific search space, the mobile station apparatus 200 transmits the HARQ control information using the PUCCH resource in the first region. Meanwhile, in case that the mobile station apparatus 200 detects one PDCCH in the common search space, the mobile station apparatus 200 transmits the HARQ control information using the PUCCH resource in any region of the plurality of regions.

The base station apparatus 100 and the mobile station apparatus 200 thus transmit and receive the HARQ control information, and are capable of performing transmission and reception of the HARQ control information at least in case that the PDCCH is allocated in the common search space.

For example, under circumstances where a mismatch of the number of component carriers used in communications occurs between the base station apparatus 100 and the mobile station apparatus 200 (for example, circumstances where the base station apparatus 100 considers that communications are performed using five DCCs, and the mobile station apparatus 200 considers that communications are performed using three DCCs), the base station apparatus 100 allocates the PDCCH in the common search space, it is thereby possible to perform transmission and reception of the HARQ control information, and it is possible to continue communications between the base station apparatus 100 and the mobile station apparatus 200.

The base station apparatus 100 transmits, to the mobile station apparatus 200, the first parameter for designating the first region and a plurality of parameters for designating a plurality of regions, is thereby capable of designating each region corresponding to status in the managed cell (downlink resources and uplink resources, the number of mobile station apparatuses 200 that perform communications using a plurality of component carriers, the number of mobile station apparatuses 200 that perform communications using one component carrier, etc.), and is able to perform more flexible transmission control of the HARQ control information.

Further, the mobile station apparatus 200, which communicates with the base station apparatus 100 using a plurality of component carriers, transmits the HARQ control information for a plurality of PDCCHs and/or a plurality of downlink transport blocks, using the first transmission format, and is thereby capable of performing transmission control of the HARQ control information using uplink resource more efficiently.

Furthermore, the mobile station apparatus 200 transmits the HARQ control information using the first transmission format and the second transmission format, and the base station apparatus 100 is thereby capable of performing more flexible transmission control of the HARQ control information. In other words, the base station apparatus 100 is capable of performing transmission control of the HARQ control information in consideration of the information amount of the HARQ control information that the mobile station apparatus 200 transmits, the number of mobile station apparatuses 200 that transmit the HARQ control information at a certain timing, etc.

The Embodiments as described above are applicable to integrated circuits installed in the base station apparatus 100 and the mobile station apparatus 200. Further, in the above-mentioned Embodiments, a program to actualize each function inside the base station apparatus 100 and each function inside the mobile station apparatus 200 may be stored in a computer readable storage medium, and the program stored in the storage medium may be read by a computer system and executed to perform control of the base station apparatus 100 and the mobile station apparatus 200. In addition, the "computer system" described herein is assumed to include the OS and hardware of peripheral devices and the like.

Further, the "computer readable storage medium" means transportable media such as a flexible disk, magneto-optical disk, ROM, CD-ROM and the like, and storage devices such as a hard disk and the like incorporated into the computer system. Furthermore, the "computer readable storage medium" may include media that dynamically hold the program for a short time, such as communication lines in the case where the program is transmitted via communication channels of a network such as the Internet and telephone lines, and media that hold the program for a certain time, such as volatile memory inside the computer system that is the server or client in this case. Moreover, the above-mentioned program may be to actualize a part of the functions as described previously, and further, may be to actualize the functions as described previously in combination of a program already stored in the computer system.

Moreover, the present invention is capable of adopting the following aspects. In other words, a mobile communication system of the invention is a mobile communication system in which a base station apparatus and a mobile station apparatus perform communications using a plurality of component carriers, where the base station apparatus transmits a first parameter for designating a first region in which the mobile station apparatus is capable of using a physical uplink control channel to the mobile station apparatus, and further transmits a second parameter for designating a second region different from the first region in which the mobile station apparatus is capable of using the physical uplink control channel to the mobile station apparatus, and corresponding to a search space in which the mobile station apparatus detects a physical downlink control channel, the mobile station apparatus transmits HARQ control information to the base station apparatus using the first region or the second region.

Further, in the mobile communication system in which a base station apparatus and a mobile station apparatus perform communications using a plurality of component carriers, the base station apparatus transmits a first parameter for designating a first region in which the mobile station apparatus is capable of using a physical uplink control channel to the mobile station apparatus, and further transmits a second parameter for designating a second region different from the first region in which the mobile station apparatus is capable of using the physical uplink control channel to the mobile station apparatus, and the mobile station apparatus transmits HARQ control information to the base station apparatus using the first region in case of detecting a plurality of physical downlink control channels in a user equipment-specific search space and/or a common search space, while transmitting the HARQ control information to the base station apparatus using the first region or the second region in case of detecting one physical downlink control channel in the user equipment-specific search space and/or the common search space.

Furthermore, in the mobile communication system in which a base station apparatus and a mobile station apparatus perform communications using a plurality of component carriers, the base station apparatus transmits a first parameter for designating a first region in which the mobile station apparatus is capable of using a physical uplink control channel to the mobile station apparatus, and further transmits a second parameter for designating a second region different from the first region in which the mobile station apparatus is capable of using the physical uplink control channel to the mobile station apparatus, and the mobile station apparatus transmits HARQ control information to the base station apparatus using the first region in case of detecting one physical downlink control channel in a user equipment-specific search space, while transmitting the HARQ control information to the base station apparatus 100 using the second region in case of detecting one physical downlink control channel in a common search space.

Still furthermore, in the mobile communication system in which a base station apparatus and a mobile station apparatus perform communications using a plurality of component carriers, the base station apparatus transmits a first parameter for designating a first region in which the mobile station apparatus is capable of using a physical uplink control channel to the mobile station apparatus, and further transmits a second parameter for designating a second region different from the first region in which the mobile station apparatus is capable of using the physical uplink control channel to the mobile station apparatus, and the mobile station apparatus transmits HARQ control information to the base station apparatus using the first region in case of detecting a plurality of physical downlink control channels in a user equipment-specific search space and/or a common search space or detecting one physical downlink control channel in the user equipment-specific search space, while transmitting the HARQ control information to the base station apparatus using the second region in case of detecting one physical downlink control channel in the common search space.

Moreover, in the mobile communication system in which a base station apparatus and a mobile station apparatus perform communications using a plurality of component carriers, the base station apparatus transmits a first parameter for designating a first region in which the mobile station apparatus is capable of using a physical uplink control channel to the mobile station apparatus, and further transmits a second parameter for designating a second region different from the first region in which the mobile station apparatus is capable of using the physical uplink control channel to the mobile station apparatus, and the mobile station apparatus transmits HARQ control information to the base station apparatus using the first region in case that a physical downlink control channel detected in a common search space is used to assign a physical downlink shared channel on except for a specific component carrier, while transmitting the HARQ control information to the base station apparatus using the second region in case that a physical downlink control channel detected in the common search space is used to assign a physical downlink shared channel on the specific component carrier.

Further, the mobile station apparatus transmits the HARQ control information the base station apparatus using a first transmission format in the first region, while transmitting the HARQ control information to the base station apparatus using a second transmission format in the second region, and the first transmission format and the second transmission format are different transmission formats.

Furthermore, in the mobile communication system in which a base station apparatus and a mobile station apparatus perform communications using a plurality of component carriers, the base station apparatus transmits a first parameter for designating a first region in which the mobile station apparatus is capable of using a physical uplink control channel to the mobile station apparatus, and further transmits a plurality of parameters for designating a plurality of regions different from the first region in which the mobile station apparatus is capable of using the physical uplink control channel to the mobile station apparatus, and corresponding to a search space in which the mobile station apparatus detects a physical downlink control channel, the mobile station apparatus transmits HARQ control information to the base station apparatus using the first region or any region of the plurality of regions.

Still furthermore, in the mobile communication system in which a base station apparatus and a mobile station apparatus perform communications using a plurality of component carriers, the base station apparatus transmits a first parameter for designating a first region in which the mobile station apparatus is capable of using a physical uplink control channel to the mobile station apparatus, and further transmits a plurality of parameters for designating a plurality of regions different from the first region in which the mobile station apparatus is capable of using the physical uplink control channel to the mobile station apparatus, and the mobile station apparatus transmits HARQ control information to the base station apparatus using the first region in case of detecting a plurality of physical downlink control channels in a user equipment-specific search space and/or a common search space, while transmitting the HARQ control information to the base station apparatus using the first region or any region of the plurality of regions in case of detecting one physical downlink control channel in the user equipment-specific search space and/or the common search space.

Moreover, in the mobile communication system in which a base station apparatus and a mobile station apparatus perform communications using a plurality of component carriers, the base station apparatus transmits a first parameter for designating a first regions in which the mobile station apparatus is capable of using a physical uplink control channel to the mobile station apparatus, and further transmits a plurality of parameters for designating a plurality of regions different from the first region in which the mobile station apparatus is capable of using the physical uplink control channel to the mobile station apparatus, and the mobile station apparatus transmits HARQ control information to the base station apparatus using the first region in case of detecting one physical downlink control channel in a user equipment-specific search space, while transmitting the HARQ control information to the base station apparatus 100 using any region of the plurality of regions in case of detecting one physical downlink control channel in a common search space.

Further, in the mobile communication system in which a base station apparatus and a mobile station apparatus perform communications using a plurality of component carriers, the base station apparatus transmits a first parameter for designating a first region in which the mobile station apparatus is capable of using a physical uplink control channel to the mobile station apparatus, and further transmits a plurality of parameters for designating a plurality of regions different from the first region in which the mobile station apparatus is capable of using the physical uplink control channel to the mobile station apparatus, and the mobile station apparatus transmits HARQ control information to the base station apparatus using the first region in case of detecting a plurality of physical downlink control channels in a user equipment-specific search space and/or a common search space or detecting one physical downlink control channel in the user equipment-specific search space, while transmitting the HARQ control information to the base station apparatus using any region of the plurality of regions in case of detecting one physical downlink control channel in the common search space.

Furthermore, in the mobile communication system in which a base station apparatus and a mobile station apparatus perform communications using a plurality of component carriers, the base station apparatus transmits a first parameter for designating a first region in which the mobile station apparatus is capable of using a physical uplink control channel to the mobile station apparatus, and further transmits a plurality of parameters for designating a plurality of regions different from the first region in which the mobile station apparatus is capable of using the physical uplink control channel to the mobile station apparatus, and the mobile station apparatus transmits HARQ control information to the base station apparatus using the first region in case that a physical downlink control channel detected in a common search space is used to assign a physical downlink shared channel on except for a specific component carrier, while transmitting the HARQ control information to the base station apparatus using any region of the plurality of regions in case that a physical downlink control channel detected in the common search space is used to assign a physical downlink shared channel on the specific component carrier Still furthermore, the mobile station apparatus transmits the HARQ control information to the base station apparatus using a first transmission format in the first region, while transmitting the HARQ control information to the base station apparatus using a second transmission format in any region of the plurality of regions, and the first transmission format and the second transmission format are different transmission formats.

Further, the HARQ control information is information indicative of ACK or NACK for a downlink transport block transmitted on a physical downlink shared channel.

Furthermore, the HARQ control information is information indicating that the mobile station apparatus was not able to detect the physical downlink control channel.

Further, a base station apparatus in a mobile communication system in which the base station apparatus and a mobile station apparatus perform communications using a plurality of component carriers comprising: means for transmitting a first parameter for designating a first region in which the mobile station apparatus is capable of using a physical uplink control channel to the mobile station apparatus, means for transmitting a second parameter for designating a second region different from the first region in which the mobile station apparatus is capable of using the physical uplink control channel to the mobile station apparatus, and means for receiving HARQ control information from the mobile station apparatus transmitted using the first region or the second region corresponding to a search space in which the mobile station apparatus detects a physical downlink control channel.

Furthermore, a base station apparatus in a mobile communication system in which the base station apparatus and a mobile station apparatus perform communications using a plurality of component carriers comprising: means for transmitting a first parameter for designating a first region in which the mobile station apparatus is capable of using a physical uplink control channel to the mobile station apparatus, means for transmitting a plurality of parameters for designating a plurality of regions different from the first region in which the mobile station apparatus is capable of using the physical uplink control channel to the mobile station apparatus, and means for receiving HARQ control information from the mobile station apparatus transmitted using the first region or any region of the plurality of regions corresponding to a search space in which the mobile station apparatus detects a physical downlink control channel.

Further, a mobile station apparatus in a mobile communication system in which a base station apparatus and the mobile station apparatus perform communications using a plurality of component carriers comprising: means for receiving a first parameter for designating a first region in which the mobile station apparatus is capable of using a physical uplink control channel from the base station apparatus, means for receiving a second parameter for designating a second space different from the first region in which the mobile station apparatus is capable of using the physical uplink control channel from the base station apparatus, and means for transmitting HARQ control information to the base station apparatus using the first region or the second region corresponding to a search space in which the mobile station apparatus detects a physical downlink control channel.

Furthermore, a mobile station apparatus in a mobile communication system in which a base station apparatus and the mobile station apparatus perform communications using a plurality of component carriers comprising: means for receiving a first parameter for designating a first region in which the mobile station apparatus is capable of using a physical uplink control channel from the base station apparatus, means for receiving a plurality of parameters for designating a plurality of regions different from the first region in which the mobile station apparatus is capable of using the physical uplink control channel from the base station apparatus, and means for transmitting HARQ control information to the base station apparatus using the first region or any region of the plurality of regions corresponding to a search space in which the mobile station apparatus detects a physical downlink control channel.

Further, in a communication method in a base station apparatus in a mobile communication system in which the base station apparatus and a mobile station apparatus perform communications using a plurality of component carriers, the base station apparatus transmits a first parameter for designating a first region in which the mobile station apparatus is capable of using a physical uplink control channel to the mobile station apparatus, further transmits a second parameter for designating a second region different from the first region in which the mobile station apparatus is capable of using the physical uplink control channel to the mobile station apparatus, and receives HARQ control information from the mobile station apparatus using the first region or the second region corresponding to a search space in which the mobile station apparatus detects a physical downlink control channel.

Furthermore, in a communication method in a base station apparatus in a mobile communication system in which the base station apparatus and a mobile station apparatus perform communications using a plurality of component carriers, the base station apparatus transmits a first parameter for designating a first region in which the mobile station apparatus is capable of using a physical uplink control channel to the mobile station apparatus, further transmits a plurality of parameters for designating a plurality of regions different from the first region in which the mobile station apparatus is capable of using the physical uplink control channel to the mobile station apparatus, and receives HARQ control information from the mobile station apparatus using the first region or any region of the plurality of regions corresponding to a search space in which the mobile station apparatus detects a physical downlink control channel.

Further, in a communication method in a mobile station apparatus in a mobile communication system in which a base station apparatus and the mobile station apparatus perform communications using a plurality of component carriers, the mobile station apparatus receives a first parameter for designating a first region in which the mobile station apparatus is capable of using a physical uplink control channel from the base station apparatus, further receives a second parameter for designating a second region different from the first region in which the mobile station apparatus is capable of using the physical uplink control channel from the base station apparatus, and transmits HARQ control information to the base station apparatus using the first region or the second region corresponding to a search space in which the mobile station apparatus detects a physical downlink control channel.

Furthermore, in a communication method in a mobile station apparatus in a mobile communication system in which a base station apparatus and the mobile station apparatus perform communications using a plurality of component carriers, the mobile station apparatus receives a first parameter for designating a first region in which the mobile station apparatus is capable of using a physical uplink control channel from the base station apparatus, further receives a plurality of parameters for designating a plurality of regions different from the first region in which the mobile station apparatus is capable of using the physical uplink control channel from the base station apparatus, and transmits HARQ control information to the base station apparatus using the first region or any region of the plurality of spaces corresponding to a search space in which the mobile station apparatus detects a physical downlink control channel.

As mentioned above, the Embodiments of the invention are described specifically with reference to the drawings, but specific configurations are not limited to the Embodiments, and designs and others in the scope without departing from the subject matter of the invention are included in the scope of claims.

DESCRIPTION OF SYMBOLS

100 Base station apparatus
101 Data control unit
102 Transmission data modulation unit
103 Radio unit
104 Scheduling unit
105 Channel estimation unit
106 Reception data demodulation unit
107 Data extraction unit
108 Higher layer
109 Antenna
110 Radio resource control unit
200 Mobile station apparatus
201 Data control unit
202 Transmission data modulation unit
203 Radio unit
204 Scheduling unit
205 Channel estimation unit
206 Reception data demodulation unit
207 Data extraction unit
208 Higher layer
209 Antenna
210 Radio resource control unit

The invention claimed is:

1. A mobile station apparatus that communicates with a base station apparatus using a plurality of downlink component carriers, the mobile station apparatus comprising:
   a transmitting unit configured to transmit, to the base station apparatus, Hybrid Automatic Repeat Request (HARQ) control information using a first physical uplink control channel resource and a second physical uplink control channel resource, wherein
   the transmitting unit is configured to transmit in a subframe, to the base station apparatus, the HARQ control information using the first physical uplink control channel resource, the first physical uplink control channel resource being used for the transmission of the HARQ control information for a plurality of physical downlink shared channel transmissions, the plurality of physical downlink shared channel transmissions being indicated by a detection of a plurality of physical downlink control channels, and
   the transmitting unit is configured to transmit in a subframe, to the base station apparatus, the HARQ control information using the second physical uplink control channel resource, the second physical uplink control channel resource being used for the transmission of the HARQ control information for a physical downlink shared channel transmission, the physical downlink shared channel transmission being indicated by a detection of a physical downlink control channel in a common search space.

2. A mobile station apparatus that communicates with a base station apparatus using a plurality of downlink component carriers, the mobile station apparatus comprising:
   a transmitting unit configured to transmit, to the base station apparatus, Hybrid Automatic Repeat Request (HARQ) control information using a first physical uplink control channel resource and a second physical uplink control channel resource, wherein
   the transmitting unit is configured to transmit in a subframe, to the base station apparatus, the HARQ control information using the first physical uplink control channel resource, the first physical uplink control channel resource being used for the transmission of the HARQ control information for a plurality of physical downlink shared channel transmissions on the plurality of downlink component carriers, the plurality of physical downlink shared channel transmissions being indicated by a detection of a plurality of physical downlink control channels, and
   the transmitting unit is configured to transmit in a subframe, to the base station apparatus, the HARQ control information using the second physical uplink control channel resource, the second physical uplink control channel resource being used for the transmission of the HARQ control information for a physical downlink shared channel transmission only on a specific downlink component carrier, the physical downlink shared channel transmission being indicated by a detection of a physical downlink control channel in a common search space.

3. The mobile station apparatus according to claim 2, wherein
the specific downlink component carrier is indicated, by the base station apparatus, using a radio resource control signal.

4. The mobile station apparatus according to claim 2, wherein
the specific downlink component carrier is a downlink component carrier associated with an uplink component carrier on which the HARQ control information is transmitted using a physical uplink control channel.

5. The mobile station apparatus according to claim 1, wherein
the HARQ control information includes information indicative of a positive acknowledgment or a negative acknowledgement for a downlink transport block.

6. A base station apparatus that communicates with a mobile station apparatus using a plurality of downlink component carriers, the base station apparatus comprising:
a receiving unit configured to receive, from the mobile station apparatus, Hybrid Automatic Repeat Request (HARQ) control information using a first physical uplink control channel resource and a second physical uplink control channel resource, wherein
the receiving unit is configured to receive in a subframe, from the mobile station apparatus, the HARQ control information using the first physical uplink control channel resource, the first physical uplink control channel resource being used for the reception of the HARQ control information for a plurality of physical downlink shared channel transmissions, the plurality of physical downlink shared channel transmissions being scheduled by a plurality of physical downlink control channels, and
the receiving unit is configured to receive in a subframe, from the mobile station apparatus, the HARQ control information using the second physical uplink control channel resource, the second physical uplink control channel resource being used for the reception of the HARQ control information for a physical downlink shared channel transmission, the physical downlink shared channel transmission being scheduled by a physical downlink control channel in a common search space.

7. A base station apparatus that communicates with a mobile station apparatus using a plurality of downlink component carriers, the base station apparatus comprising:
a receiving unit configured to receive, from the mobile station apparatus, Hybrid Automatic Repeat Request (HARQ) control information using a first physical uplink control channel resource and a second physical uplink control channel resources, wherein
the receiving unit is configured to receive in a subframe, from the mobile station apparatus, the HARQ control information using the first physical uplink control channel resource, the first physical uplink control channel resource being used for the reception of the HARQ control information for a plurality of physical downlink shared channel transmissions on the plurality of downlink component carriers, the plurality of physical downlink shared channel transmissions being scheduled by a plurality of physical downlink control channels, and
the receiving unit is configured to receive in a subframe, from the mobile station apparatus, the HARQ control information using the second physical uplink control channel resource, the second physical uplink control channel resource being used for the reception of the HARQ control information for a physical downlink shared channel transmission only on a specific downlink component carrier, the physical downlink shared channel transmission being scheduled by a physical downlink control channel in a common search space.

8. The base station apparatus according to claim 7, wherein
the specific downlink component carrier is indicated, by the base station apparatus, using a radio resource control signal.

9. The base station apparatus according to claim 7, wherein
the specific downlink component carrier is a downlink component carrier associated with an uplink component carrier on which the HARQ control information is transmitted using a physical uplink control channel.

10. The base station apparatus according to claim 6, wherein
the HARQ control information includes information indicative of a positive acknowledgment or a negative acknowledgment for a downlink transport block.

11. A communication method of a mobile station apparatus that communicates with a base station apparatus using a plurality of downlink component carriers, the communication method comprising:
transmitting, to the base station apparatus, Hybrid Automatic Repeat Request (HARQ) control information using a first physical uplink control channel resource and a second physical uplink control channel resource,
transmitting in a subframe, to the base station apparatus, the HARQ control information using the first physical uplink control channel resource, the first physical uplink control channel resource being used for the transmission of the HARQ control information for a plurality of physical downlink shared channel transmissions, the plurality of physical downlink shared channel transmissions being indicated by a detection of a plurality of physical downlink control channels, and
transmitting in a subframe, to the base station apparatus, the HARQ control information using the second physical uplink control channel resource, the second physical uplink control channel resource being used for the transmission of the HARQ control information for a physical downlink shared channel transmission, the physical downlink shared channel transmission being indicated by a detection of a physical downlink control channel in a common search space.

12. A communication method of a mobile station apparatus that communicates with a base station apparatus using a plurality of downlink component carriers, the communication method comprising:
transmitting, to the base station apparatus, Hybrid Automatic Repeat Request (HARQ) control information using a first physical uplink control channel resource and a second physical uplink control channel resource,
transmitting in a subframe, to the base station apparatus, the HARQ control information using the first physical uplink control channel resource, the first physical uplink control channel resource being used for the transmission of the HARQ control information for a plurality of physical downlink shared channel transmissions on the plurality of downlink component carriers, the plurality of physical downlink shared channel transmissions being indicated by a detection of a plurality of physical downlink control channels, and transmitting in a subframe, to the base station apparatus, the HARQ control information using the second physical uplink control channel resource, the second physical uplink control channel resource being used for the transmission of the HARQ control information for a physical downlink shared channel transmission only on a specific downlink component carrier, the physical downlink shared channel transmission being indicated by a detection of a physical downlink control channel in a common search space.

13. A communication method of a base station apparatus that communicates with a mobile station apparatus using a plurality of downlink component carriers, the communication method comprising:

receiving, from the mobile station apparatus, Hybrid Automatic Repeat Request (HARQ) control information using a first physical uplink control channel resource and a second physical uplink control channel resource, receiving in a subframe, from the mobile station apparatus, the HARQ control information using the first physical uplink control channel resource, the first physical uplink control channel resource being used for the reception of the HARQ control information for a plurality of physical downlink shared channel transmissions, the plurality of physical downlink shared channel transmissions being scheduled by a plurality of physical downlink control channels, and receiving in a subframe, from the mobile station apparatus, the HARQ control information using the second physical uplink control channel resource, the second physical uplink control channel resource being used for the reception of the HARQ control information for a physical downlink shared channel transmission, the physical downlink shared channel transmission being scheduled by a physical downlink control channel in a common search space.

14. A communication method of a base station apparatus that communicates with a mobile station apparatus using a plurality of downlink component carriers, the communication method comprising:

receiving, from the mobile station apparatus, Hybrid Automatic Repeat Request (HARQ) control information using a first physical uplink control channel resource and a second physical uplink control channel resource, receiving in a subframe, from the mobile station apparatus, the HARQ control information using the first physical uplink control channel resource, the first physical uplink control channel resource being used for the reception of the HARQ control information for a plurality of physical downlink shared channel transmissions on the plurality of downlink component carriers, the plurality of physical downlink shared channel transmissions being scheduled by a plurality of physical downlink control channels, and receiving in a subframe, from the mobile station apparatus, the HARQ control information using the second physical uplink control channel resource, the second physical uplink control channel resource being used for the reception of the HARQ control information for a physical downlink shared channel transmission only on a specific downlink component carrier, the physical downlink shared channel transmission being scheduled by a physical downlink control channel in a common search space.

15. The mobile station apparatus according to claim 2, wherein the HARQ control information includes information indicative of a positive acknowledgment or a negative acknowledgment for a downlink transport block.

16. The base station apparatus according to claim 7, wherein the HARQ control information includes information indicative of a positive acknowledgment or a negative acknowledgment for a downlink transport block.

17. The mobile station apparatus according to claim 1, wherein each of the plurality of physical downlink control channels is detected in a user equipment-specific search space.

18. The mobile station apparatus according to claim 17, wherein the each of the plurality of physical downlink control channels that is detected in the user equipment search space is the physical downlink control channel with Cyclic Redundancy Check (CRC) scrambled by a Cell-Radio Network Temporary Identity (C-RNTI).

19. The mobile station apparatus according to claim 1, wherein the physical downlink control channel that is detected in the common search space is the physical downlink control channel with Cyclic Redundancy Check (CRC) scrambled by a Cell-Radio Network Temporary Identity (C-RNTI).

20. The mobile station apparatus according to claim 2, wherein each of the plurality of physical downlink control channels is detected in a user equipment-specific search space.

21. The mobile station apparatus according to claim 20, wherein the each of the plurality of physical downlink control channels that is detected in the user equipment search space is the physical downlink control channel with Cyclic Redundancy Check (CRC) scrambled by a Cell-Radio Network Temporary Identity (C-RNTI).

22. The mobile station apparatus according to claim 2, wherein the physical downlink control channel that is detected in the common search space is the physical downlink control channel with Cyclic Redundancy Check (CRC) scrambled by a Cell-Radio Network Temporary Identity (C-RNTI).

23. The base station apparatus according to claim 6, wherein each of the plurality of physical downlink control channels is detected in a user equipment-specific search space.

24. The base station apparatus according to claim 23, wherein the each of the plurality of physical downlink control channels that is detected in the user equipment search space is the physical downlink control channel with Cyclic Redundancy Check (CRC) scrambled by a Cell-Radio Network Temporary Identity (C-RNTI).

25. The base station apparatus according to claim 6, wherein the physical downlink control channel that is detected in the common search space is the physical downlink control channel with Cyclic Redundancy Check (CRC) scrambled by a Cell-Radio Network Temporary Identity (C-RNTI).

26. The base station apparatus according to claim 7, wherein
   each of the plurality of physical downlink control channels is detected in a user equipment-specific search space.

27. The base station apparatus according to claim 26, wherein
   the each of the plurality of physical downlink control channels that is detected in the user equipment search space is the physical downlink control channel with Cyclic Redundancy Check (CRC) scrambled by a Cell-Radio Network Temporary Identity (C-RNTI).

28. The base station apparatus according to claim 7, wherein
   the physical downlink control channel that is detected in the common search space is the physical downlink control channel with Cyclic Redundancy Check (CRC) scrambled by a Cell-Radio Network Temporary Identity (C-RNTI).

* * * * *